United States Patent
Hamada et al.

(10) Patent No.: US 10,447,876 B2
(45) Date of Patent: Oct. 15, 2019

(54) IMAGE READING APPARATUS

(71) Applicant: CANON KABUSHIKI KAISHA, Tokyo (JP)

(72) Inventors: Kaoru Hamada, Nagareyama (JP); Yushi Oka, Abiko (JP); Masato Furukawa, Nagareyama (JP); Seiji Shibaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/625,963

(22) Filed: Jun. 16, 2017

(65) Prior Publication Data
US 2018/0007223 A1   Jan. 4, 2018

(30) Foreign Application Priority Data

Jun. 30, 2016   (JP) .................. 2016-130384

(51) Int. Cl.
*H04N 1/04* (2006.01)
*H04N 1/00* (2006.01)
(Continued)

(52) U.S. Cl.
CPC ..... *H04N 1/00801* (2013.01); *H04N 1/00034* (2013.01); *H04N 1/00602* (2013.01);
(Continued)

(58) Field of Classification Search
CPC ........... H04N 1/00801; H04N 1/00034; H04N 1/00602; H04N 1/00604; H04N 1/193; H04N 1/3878; H04N 2201/0081
(Continued)

(56) References Cited

U.S. PATENT DOCUMENTS

2005/0169681 A1* 8/2005 Hata ................ G03G 15/602
399/367
2010/0252986 A1* 10/2010 Nakajima ........... B41J 11/0095
271/3.14
(Continued)

FOREIGN PATENT DOCUMENTS

| JP | H09-222752 | 8/1997 |
| JP | 2002-268467 | 9/2002 |
| JP | 2007-060565 | 3/2007 |

OTHER PUBLICATIONS

U.S. Appl. No. 15/400,225, filed Jan. 6, 2017.

*Primary Examiner* — Cheukfan Lee
(74) *Attorney, Agent, or Firm* — Venable LLP

(57) ABSTRACT

An image reading apparatus, including: a first distance detector configured to measure a first distance of the original conveyed after a sensor is changed from a first state detecting the original to a second state not detecting the original; a second distance detector configured to measure a second distance of the original conveyed after the second state is changed to the first state; and a controller configured to control a conveyor so that the conveyor starts a conveyance of a succeeding original when the second distance reaches a conveyance permission distance before the first distance reaches a hole detection distance and the conveyor stops the succeeding original when the second state is changed to the first state before the first distance reaches the hole detection distance, and thereafter starts the conveyance of the succeeding original when the first distance reaches the hole detection distance.

10 Claims, 11 Drawing Sheets

(51) Int. Cl.
H04N 1/193 (2006.01)
H04N 1/387 (2006.01)

(52) U.S. Cl.
CPC ......... *H04N 1/00604* (2013.01); *H04N 1/193* (2013.01); *H04N 1/3878* (2013.01); *H04N 2201/0081* (2013.01)

(58) Field of Classification Search
USPC ........................................ 358/498, 496, 488
See application file for complete search history.

(56) References Cited

U.S. PATENT DOCUMENTS

| | | | |
|---|---|---|---|
| 2016/0366287 A1* | 12/2016 | Murata | H04N 1/00013 |
| 2017/0094088 A1* | 3/2017 | Murata | H04N 1/00822 |
| 2017/0214816 A1 | 7/2017 | Yamakawa et al. | H04N 1/04 |

* cited by examiner

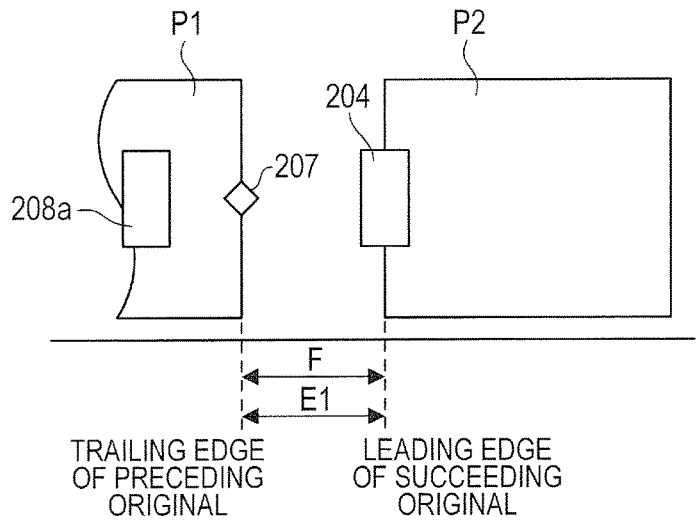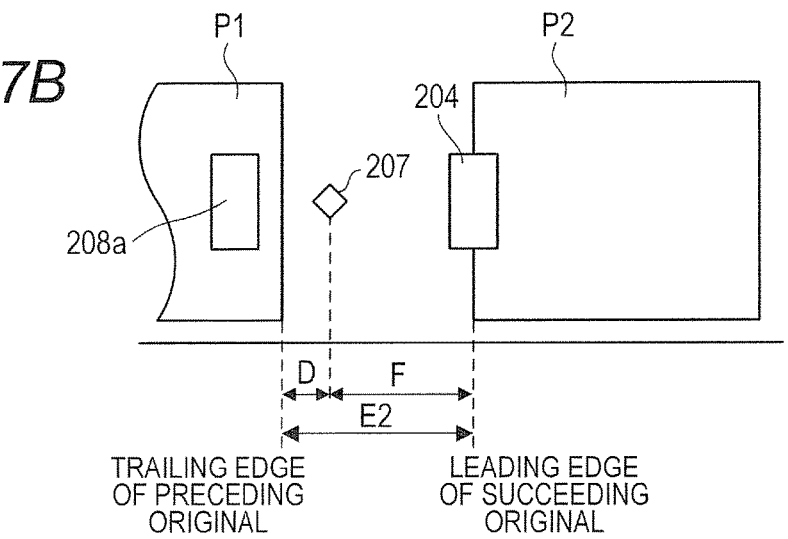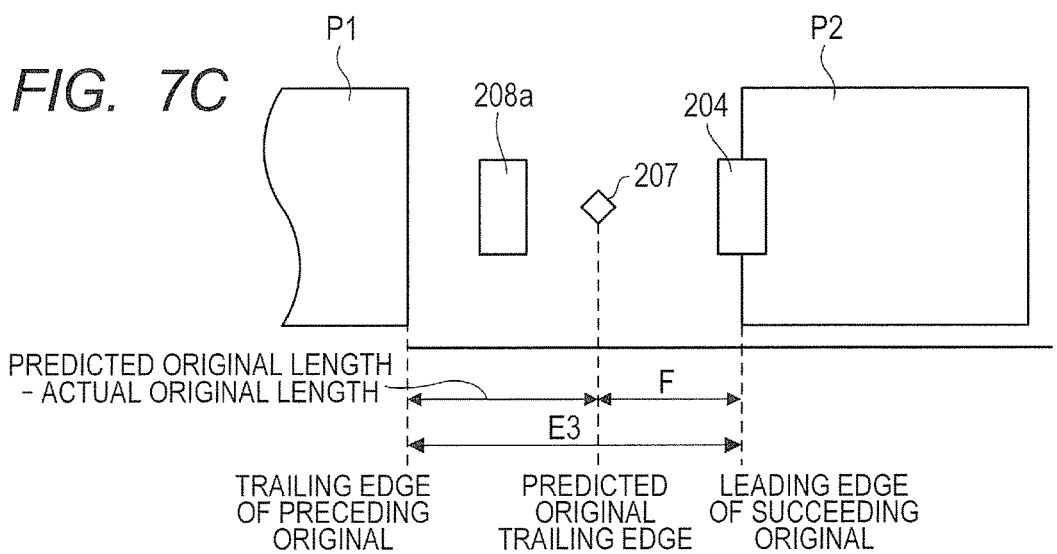

IMAGE READING APPARATUS

BACKGROUND OF THE INVENTION

Field of the Invention

The present invention relates to an image reading apparatus including a conveyor configured to convey an original to a reading position.

Description of the Related Art

In image reading apparatus of the related art, originals placed on an original tray are conveyed one sheet at a time by a conveyor to a reading position, where an image sensor reads an image on the original. The image reading apparatus are capable of executing scan operation that reads a plurality of originals while the originals are conveyed in succession (hereinafter referred to as "first reading mode"). The conveyor usually detects the leading edge portion and trailing edge portion of an original with the use of an original sensor provided near the entrance of a conveying path. The image reading apparatus determines the timing to start conveying the succeeding original and a reading area of the succeeding original based on the time at which the trailing edge portion of the preceding original is detected.

However, when the image reading apparatus reads an original that has a punched hole or other holes (hereinafter referred to as "original hole") (an original of this type is hereinafter referred to as "original with a hole"), the leading edge portion of the original hole is sometimes erroneously detected as the trailing edge portion of the original. This erroneous detection is avoided in Japanese Patent Application Laid-Open No. H09-222752 by determining that an original hole is detected instead of the trailing edge portion of an original in the case where the presence of an original is detected within a given period of time since the detection of the absence of an original by an original sensor configured to detect an original that is being conveyed.

In Japanese Patent Application Laid-Open No. 2007-060565, it is determined that an original hole is detected in the case where an original sensor configured to detect an original that is being conveyed detects the presence of an original in a time period where an original finishes being conveyed by a given distance since the detection of the absence of an original by the original sensor. In the case where the original sensor does not detect the presence of an original in the time period where an original finishes being conveyed by a given distance since the detection of the absence of an original by the original sensor, it is determined that the trailing edge portion of an original is detected.

In Japanese Patent Application Laid-Open No. 2002-268467, the length of an original is determined from an original size that is specified in advance. It is determined that the trailing edge portion of the original is detected in the case where the original finishes being conveyed by a distance that corresponds to the obtained original length since the detection of the leading edge portion of the original by an original sensor and the original sensor detects the absence of an original.

However, the conveyance of the succeeding original in Japanese Patent Application Laid-Open No. H09-222752 is started not when the absence of an original (the trailing edge of an original) is detected, but after the preceding original is conveyed for a given period of time. The conveyance of the succeeding original in Japanese Patent Application Laid-Open No. 2007-060565 is started not when the absence of an original (the trailing edge of an original) is detected, but after the preceding original finishes being conveyed by a given distance. The image reading processing performance in Japanese Patent Application Laid-Open No. H09-222752 and Japanese Patent Application Laid-Open No. 2007-060565 is therefore low when images on a plurality of originals are read. When an original larger than a pre-specified original size is conveyed in Japanese Patent Application Laid-Open No. 2002-268467, an original hole may erroneously be detected as the trailing edge portion of an original in the case where the original hole is past a point at which an original length obtained from the pre-specified original size ends in a direction toward the trailing edge portion of the original. If the conveyance of the succeeding original is started based on the detection result in which the original hole is erroneously detected as the trailing edge portion of the original, there is a fear that the succeeding original may come into contact with the preceding original, thereby causing a jam.

SUMMARY OF THE INVENTION

The present invention therefore provides an image reading apparatus configured to properly convey an original from which an image is to be read without reducing the original image reading processing performance.

According to one embodiment of the present invention, there is provided an image reading apparatus, comprising:
  an image sensor configured to read an image on an original;
  an original tray on which the original is to be placed;
  a conveyor configured to convey the original placed on the original tray to a reading position in which the image sensor reads the original;
  an original sensor provided between the original tray and the reading position and configured to assume a first state when the original sensor detects the original that is being conveyed by the conveyor and assume a second state when the original sensor does not detect the original;
  a first distance detector configured to measure a first conveyance distance of the original by which the original has been conveyed from a time when the original sensor is changed from the first state to the second state;
  a second distance detector configured to measure a second conveyance distance of the original by which the original has been conveyed from a time when the original sensor is changed from the second state to the first state before the original sensor is changed from the first state to the second state; and
  a controller configured to control the conveyor so that:
    the conveyor starts a conveyance of a succeeding original in a case where the succeeding original is on the original tray when the second conveyance distance reaches a conveyance permission distance while the original sensor remains in the second state after the original sensor changes from the first state to the second state and before the first conveyance distance reaches a hole detection distance; and
    the conveyor stops the conveyance of the succeeding original in a case where the original sensor changes from the second state to the first state after the conveyance of the succeeding original is started and before the first conveyance distance reaches the hole detection distance, and thereafter starts the conveyance of the succeeding original when the first conveyance distance reaches the hole detection distance.

According to another embodiment of the present invention, there is provided an image reading apparatus, comprising:
an image sensor configured to read an image on an original;
an original tray on which the original is to be placed;
a conveyor configured to convey the original placed on the original tray to a reading position in which the image sensor reads the original;
a first original sensor provided between the original tray and the reading position and configured to assume a first state when the first original sensor detects the original that is being conveyed by the conveyor, and assume a second state when the first original sensor does not detect the original;
a second original sensor provided downstream of the first original sensor in a conveyance direction of the original between the original tray and the reading position and configured to assume a first state when the second original sensor detects the original that is being conveyed by the conveyor, and assume a second state when the second original sensor does not detect the original;
a first distance detector configured to measure a first conveyance distance of the original by which the original has been conveyed from a time when the first original sensor is changed from the first state to the second state;
a second distance detector configured to measure a second conveyance distance of the original by which the original has been conveyed from a time when the second original sensor is changed from the second state to the first state before the first original sensor is changed from the first state to the second state; and
a controller configured to control the conveyor so that:
the conveyor starts a conveyance of a succeeding original in a case where the succeeding original is on the original tray when the second conveyance distance reaches a conveyance permission distance while the first original sensor remains in the second state after the first original sensor changes from the first state to the second state and before the first conveyance distance reaches a hole detection distance; and
the conveyor stops the conveyance of the succeeding original in a case where the first original sensor changes from the second state to the first state after the conveyance of the succeeding original is started and before the first conveyance distance reaches the hole detection distance, and thereafter starts the conveyance of the succeeding original when the first conveyance distance reaches the hole detection distance.

Further features of the present invention will become apparent from the following description of exemplary embodiments with reference to the attached drawings.

BRIEF DESCRIPTION OF THE DRAWINGS

FIG. 7A, FIG. 7B, and FIG. 7C are each an explanatory diagram for illustrating a preceding original with a hole and the succeeding original in the first embodiment.

DESCRIPTION OF THE EMBODIMENTS

Modes for carrying out the present invention will be described below with reference to the accompanying drawings.

First Embodiment

<Image Reading Apparatus>

Figure 1:
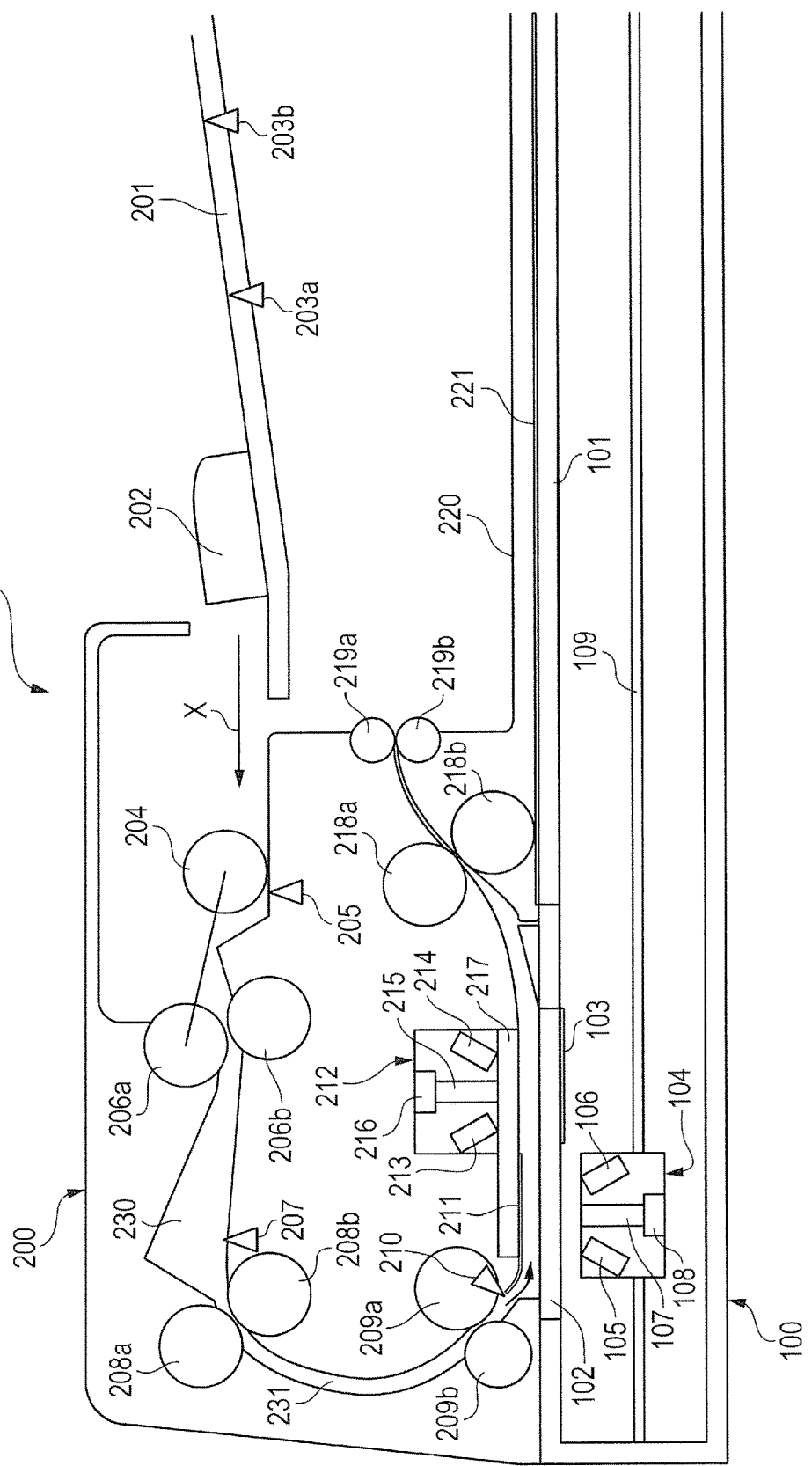
FIG. 1 is a sectional view of a main part of an automatic original reading apparatus according to a first embodiment of the present invention.

An automatic original reading apparatus 1 will be described below as an example of an image reading apparatus. FIG. 1 is a sectional view of a main part of the automatic original reading apparatus 1 according to a first embodiment of the present invention. The automatic original reading apparatus 1 may be provided in, for example, a copying machine or other electrophotographic image forming apparatus (not shown). The automatic original reading apparatus 1 includes an original reader 100 configured to read an image on an original (a sheet) and an auto document feeder (hereinafter abbreviated as "ADF") 200 configured to feed an original to the original reader 100. A reader controller 300 (FIG. 2), which will be described later, is connected to the automatic original reading apparatus 1. The ADF 200 serving as a conveyor is connected to the original reader 100 by an open-close hinge (not shown), which is provided on the far side of a top surface of the original reader 100, so that the ADF 200 opens and closes freely.

<Original Reader>

The original reader 100 will be described with reference to FIG. 1. The original reader 100 includes platen glass 101, front surface reading glass 102, a first image sensor unit (hereinafter referred to as "front surface reading portion") 104 configured to read an image on the front surface of an original, an optical motor 305 (FIG. 2), and a guide member 109. The front surface reading glass 102 is formed integrally with a rear surface white opposite member 103, which serves as a white reference member, as illustrated in FIG. 1. The original reader 100 can operate in a first reading mode and in a second reading mode. In the second reading mode, the original reader 100 uses the front surface reading portion 104 to read an image on the front surface of an original placed on the platen glass 101, while moving the front surface reading portion 104 along the guide member 109 with the use of the optical motor 305. The original reader 100 in the first reading mode uses the front surface reading portion 104 to read an image on an original that is fed onto the front surface reading glass 102 by the ADF 200.

<ADF>

The ADF 200 will be described with reference to FIG. 1. The ADF 200 includes an original tray 201, a pickup roller 204, a separating roller pair 206 (206a and 206b), a registration roller pair 208 (208a and 208b), and an upstream-of-read roller pair 209 (209a and 209b). The ADF 200 also includes a second image sensor unit (hereinafter referred to as "rear surface reading portion") 212 configured to read an image on the rear surface of an original. Rear surface reading glass 217 is formed integrally with a front surface white opposite member 211, which serves as a white reference member, as illustrated in FIG. 1. The ADF 200 is provided with an original presence/absence sensor 205, which is configured to detect the presence or absence of an original placed on the original tray 201.

An original bundle made up of more than one original is placed on the original tray 201, which serves as an original placing portion. The pickup roller 204 is configured to feed the top document in the original bundle one sheet at a time by rotating while in contact with the topmost surface of the original bundle placed on the original tray 201. The separating roller pair 206 is configured to keep the original bundle from advancing from the original tray 201 to the downstream in a conveyance direction X before the feeding of the originals is started. The originals conveyed by the pickup roller 204 are separated from one another by the working of the separating roller pair 206 serving as a separating mechanism to be conveyed one sheet at a time. The separating mechanism of the separating roller pair 206 is implemented by a known separation technology.

The original separated from the rest by the separating roller pair 206 is conveyed to the registration roller pair 208. The leading edge portion of the original is brought into abutment against the registration roller pair 208. The original in abutment against the registration roller pair 208 forms a loop in a registration loop space 230. The skew feed of the original is corrected in this manner. A conveying path 231 along which an original traveling past the registration roller pair 208 is conveyed to the front surface reading glass 102 is arranged to the downstream of the registration roller pair 208. The original conveyed onto the conveying path 231 is conveyed to a front surface and rear surface reading position by the upstream-of-read roller pair 209.

The original passes between the front surface reading glass 102 and the rear surface reading glass 217. While the original is traveling below the front surface white opposite member 211, which is formed integrally with the rear surface reading glass 217, front surface LEDs 105 and 106 arranged below the front surface reading glass 102 irradiate the original with light. Light reflected by the front surface of the original is received by a front surface line sensor 108 through a front surface lens array 107, and the front surface line sensor 108 thus reads an image on the front surface of the original.

When images on the front and rear surfaces of an original are to be read, the front surface reading portion 104 reads the image on the front surface of the original as described above. The image on the rear surface of the original is read by the rear surface reading portion 212. While the original is traveling above the rear surface white opposite member 103, which is formed integrally with the front surface reading glass 102, rear surface LEDs 213 and 214 arranged above the rear surface reading glass 217 irradiate the original with light. Light reflected by the rear surface of the original is received by a rear surface line sensor 216 through a rear surface lens array 215, and the rear surface line sensor 216 thus reads the image on the rear surface of the original. The front surface reading portion 104 and the rear surface reading portion 212 are contact image sensors (CISs) as illustrated in FIG. 1. Instead of contact image sensors, reduction optical systems made up of a lens array, a reflective mirror, and a CCD may be used as the front surface reading portion 104 and the rear surface reading portion 212.

The original for which image reading is finished is discharged onto a discharge tray 220 by a downstream-of-read roller pair 218 (218a and 218b) and a discharge roller pair 219 (219a and 219b).

A tray width guide 202 configured to regulate the position of an original in a width direction orthogonal to the original conveyance direction is arranged on the original tray 201. The tray width guide 202 is movable in the width direction, and a tray width guide sensor 202-1 (see FIG. 2) detects the location of the tray width guide 202. The tray width guide sensor 202-1 is also configured to detect the width of an original placed on the original tray 201 (the length of the original in a direction orthogonal to the original conveyance direction X). A first tray length sensor 203a and a second tray length sensor 203b are provided in the original tray 201. The first tray length sensor 203a and the second tray length sensor 203b are configured to detect the length of an original placed on the original tray 201 (the length of the original in the original conveyance direction X). The tray width guide sensor 202-1, the first tray length sensor 203a, and the second tray length sensor 203b make up an original size detector configured to detect the size of an original.

<Description of Block Diagram>

Figure 2:
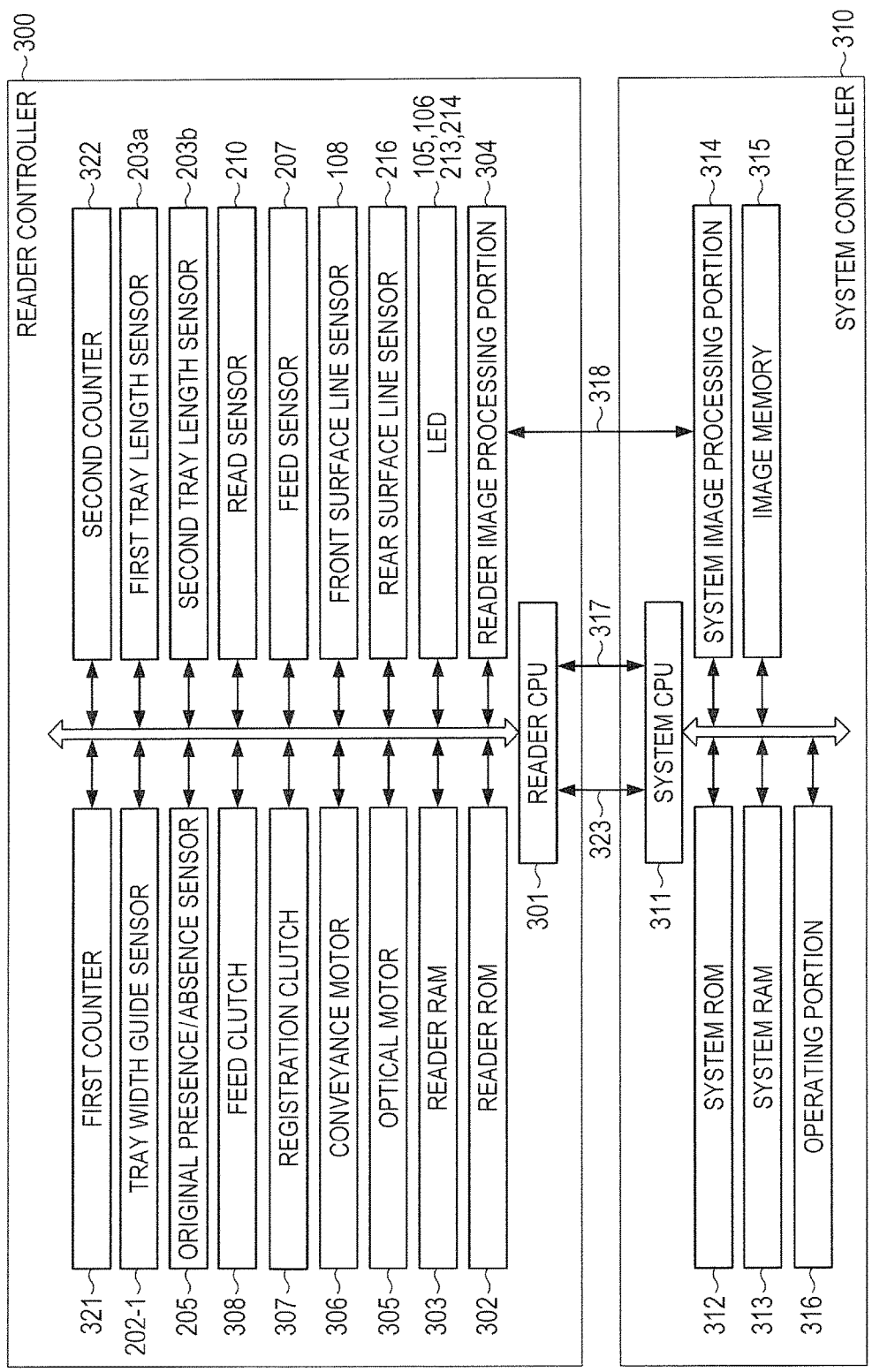
FIG. 2 is a block diagram of a control system of the automatic original reading apparatus according to the first embodiment.

FIG. 2 is a block diagram of a control system 10 of the automatic original reading apparatus 1 according to the first embodiment. The reader controller 300 includes a reader CPU 301, which is a central processing unit, a reader ROM (storage portion) 302, which is a read-only memory, and a reader RAM (storage portion) 303, which is a random access memory. The reader ROM 302 is configured to store a control program, and the reader RAM 303 is configured to store input data and work data. The reader CPU 301 is configured to execute, as programmed by the control program, feeding sequences that will be described later with reference to FIG. 3 and FIG. 8.

The reader CPU 301 is connected to a conveyance motor 306, which is configured to drive the pickup roller 204, the separating roller pair 206, the registration roller pair 208, the upstream-of-read roller pair 209, the downstream-of-read roller pair 218, and the discharge roller pair 219, in order to implement an original conveying function. The rollers driven by the conveyance motor 306 are connected to the conveyance motor 306 via, for example, a clutch used to switch between drive and stop. The reader CPU 301 is also connected to the original presence/absence sensor 205, a feed sensor 207, and a read sensor 210. The original presence/absence sensor 205 is an original sensor configured to detect an original that is placed on the original tray 201. The feed sensor 207 serving as a first original sensor (sheet sensor) is provided between the original tray 201 and a reading position of the front surface reading portion 104. The feed sensor 207 is configured to detect an original that is being conveyed on the original conveying path. The feed sensor 207 enters a first state (hereinafter referred to as "on") when an original is detected, and enters a second state (hereinafter referred to as "off") when no original is detected. The feed sensor 207 in the "on" state outputs a signal that has a high voltage or current. The feed sensor 207 in the "off" state outputs a signal that has a low voltage or current.

The read sensor 210 serving as a second original sensor (sheet sensor) is provided at a point that is between the original tray 201 and the reading position of the front surface reading portion 104 and that is downstream of the feed sensor 207 in the original conveyance direction X. The read sensor 210 is configured to detect an original that is conveyed to the front surface reading portion 104 and the rear surface reading portion 212. The read sensor 210 enters a first state (hereinafter referred to as "on") when an original is detected, and enters a second state (hereinafter referred to as "off") when no original is detected. The read sensor 210 in the "on" state outputs a signal that has a high voltage or current. The read sensor 210 in the "off" state outputs a signal that has a low voltage or current.

The conveyance motor 306 is a pulse motor. The reader CPU 301 controls the number of pulses used to drive the conveyance motor 306. The amount of travel of an original that is being conveyed (conveyance distance) can be calculated from the number of pulses. The reader CPU 301 can detect the length of an original that is being conveyed by counting the number of signal pulses that are issued to drive the conveyance motor 306 from when the read sensor 210 is turned on until when the read sensor 210 is turned off while the original is being conveyed.

The reader CPU 301 is connected to the front surface LEDs 105 and 106, the front surface line sensor 108, the rear surface LEDs 213 and 214, and the rear surface line sensor 216 in order to implement an image reading function. The reader CPU 301 uses a reader image processing portion 304 to perform various types of image processing on image data read by the front surface line sensor 108 or the rear surface line sensor 216, and transmits the processed image data to the system controller 310 via an image data bus 318. The reader CPU 301 notifies a vertical synchronization signal, which serves as a reference for the leading edge of image data, and a horizontal synchronization signal, which serves as a reference for the head pixel in one line of pixels, to the system controller 310 through a controller IF 323 in time with the reading of an original.

The system controller 310 includes a system CPU 311, a system ROM 312, and a system RAM 313. The system controller 310 is configured to exchange data about image reading control with the reader CPU 301 via a command data bus 317. Image data processed by the reader image processing portion 304 is forwarded via the image data bus 318 to a system image processing portion 314, which is provided in the system controller 310, to receive given image processing that includes determining colors. The image data is then stored in an image memory 315. The system controller 310 also includes an operating portion 316, which includes a display portion. The control of an interface to a user is performed by the system CPU 311 via the operating portion 316. The operating portion 316 enables the user to set an original size.

<Advance Feed Control>

Figure 3:
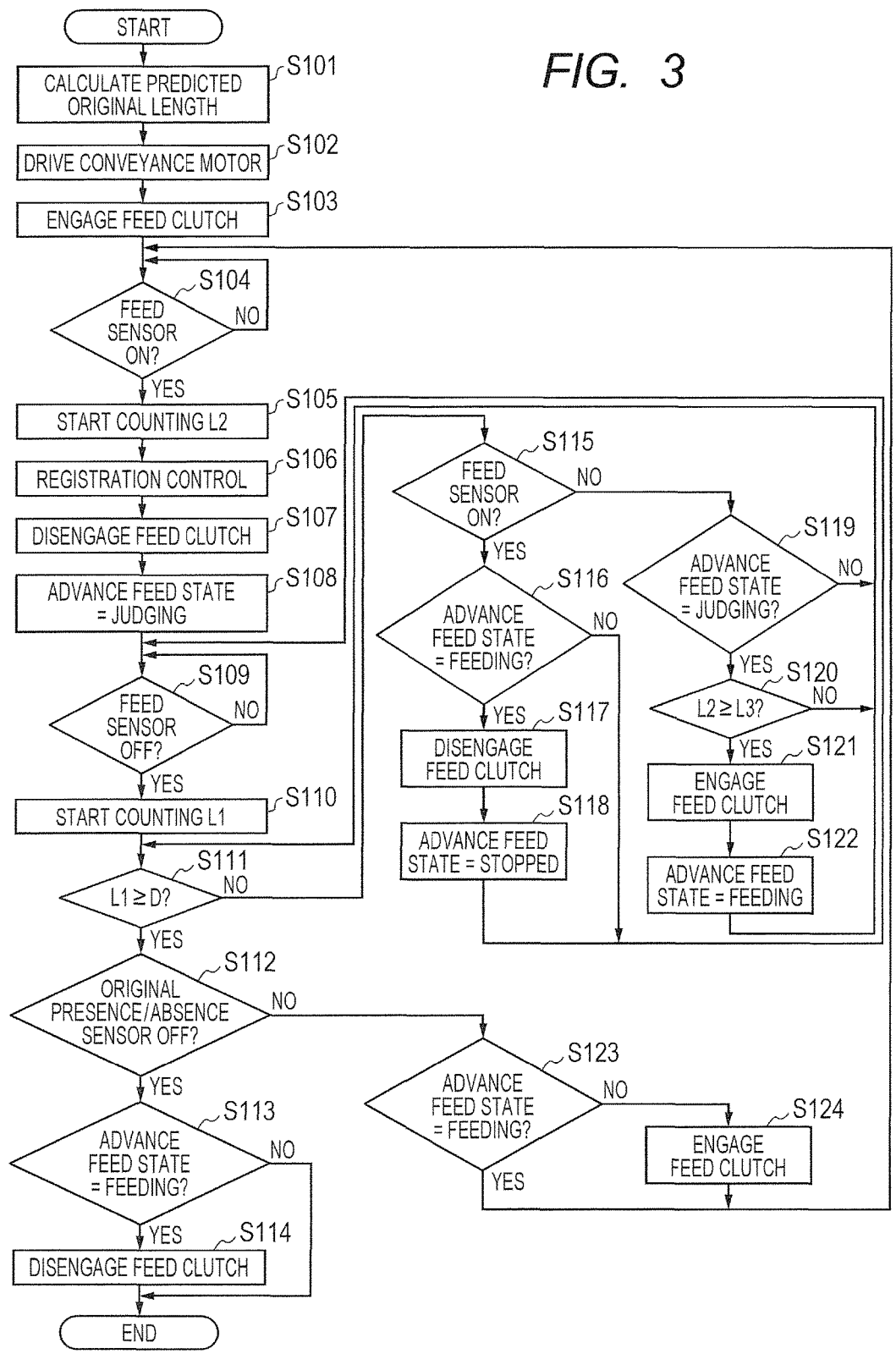
FIG. 3 is a flowchart for illustrating a feeding sequence of the first embodiment.

An original feeding sequence in the first reading mode to which advance feed control in the first embodiment is applied will be described next with reference to FIG. 3 through FIG. 7C. The advance feed control in the first embodiment involves starting the feeding of the succeeding original before the trailing edge of the immediately preceding original is detected for certain. Specifically, in the case where an original with a hole is conveyed, the feeding of the succeeding original is started before it is established that the presence of an original has not been detected for a given period of time since the detection of the absence of an original by the feed sensor 207. The reader CPU 301 parallelly processes a plurality of sequences including a feeding sequence, a reading sequence, and a discharge sequence, to thereby read a plurality of originals while executing the conveyance of one original and the conveyance of another original in parallel. FIG. 3 is a flowchart for illustrating the original feeding sequence in the first embodiment. The reader CPU 301 executes the original feeding sequence as programmed by the program stored on the reader ROM 302. FIG. 4A, FIG. 4B, FIG. 5A, and FIG. 5B are timing charts for illustrating the operation of the feed sensor 207 and the feed clutch 308 in the first embodiment.

Figure 4A:
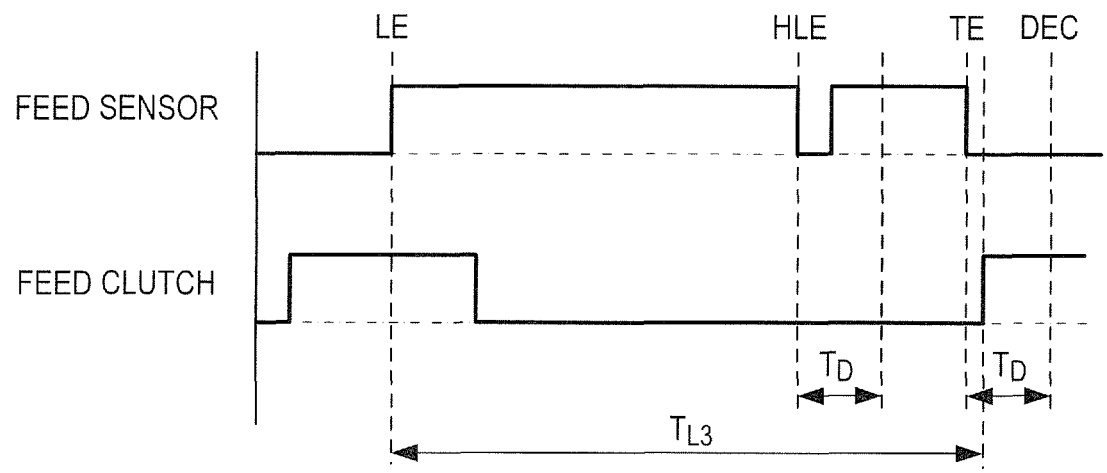
FIG. 4A and FIG. 4B are timing charts for illustrating the operation of a feed sensor and a feed clutch in the first embodiment.

A feeding sequence that is described first is for a case illustrated in FIG. 4A, where the predicted original length is equal to the actual original length of an original with a hole that is fed. FIG. 4A is a timing chart for illustrating the operation of the feed sensor 207 and the feed clutch 308 that is observed when an original with a hole whose actual original length is equal to the predicted original length is fed. The reader CPU 301 activates the feeding sequence when reading control in the first reading mode is started. When the feeding sequence is activated, the system controller 310 notifies to the reader CPU 301 an original size that is detected by the tray width guide sensor 202-1, the first tray length sensor 203a, and the second tray length sensor 203b. The reader CPU 301 calculates a predicted original length from the original size notified by the system controller 310 (Step (hereinafter omitted) S101). The original size, which is detected by the original size detector (202-1, 203a, and 203b) here, may instead be set by the user via the operating portion 316. The reader CPU 301 functions as an original length obtaining unit configured to obtain, before the conveyance of an original to be read is started, the length of the original in the conveyance direction X based on the original size. The original length obtained by the reader CPU 301 is referred to as "predicted original length". The actual length of the original is referred to as "actual original length".

The reader CPU 301 next drives the conveyance motor 306 (S102), and engages the feed clutch 308 (S103). This causes the pickup roller 204 to drop down to the original surface, and the original is conveyed by rotating the separating roller pair 206. The reader CPU 301 determines whether or not the feed sensor 207 has been turned on by the conveyed original (S104). When it is detected that the feed sensor 207 has been turned on ("YES" in S104), the reader CPU 301 starts counting to measure a second conveyance distance L2 of the original as a distance by which the original has been conveyed since the detection of a leading edge LE of the original (S105). The second conveyance distance L2 is measured through counting by a second counter (second distance detector) 322, which is connected to the reader CPU 301. The reader CPU 301 can measure the second conveyance distance L2 by counting pulses that drive the conveyance motor 306 with the use of the second counter 322. The reader CPU 301 also determines the control timing of each of actuators, which include a registration clutch 307, based on the pulses that drive the conveyance motor 306.

The reader CPU 301 next executes registration control (S106). The registration control is accomplished by a known technology that is used to shape an original into a loop in the registration loop space 230. The original for which skew feed has been corrected by the registration control is conveyed to a first reading position. After the registration control is ended, the reader CPU 301 disengages the feed clutch 308 (S107), and stops feed control.

After the feed control is ended, the reader CPU 301 sets the advance feed state of the succeeding original to "judging" (S108). The advance feed state is represented by a flag for identifying the control state in advance feed control, and one of "judging", "feeding", and "stopped" is set as the value of the flag. The value "judging" indicates a state in which the feeding of the succeeding original is not started yet, and whether or not advance feed is executable is being determined from the time at which the read sensor 210 is turned on and from the predicted original length. The value "feeding" indicates a state in which the feeding of the succeeding original is actually started. The advance feed state shifts to "feeding" in the case where it is determined that the advance feed of the succeeding original is executable while the advance feed state is "judging". The value "stopped" indicates a state in which advance feed is stopped. The advance feed state shifts to "stopped" in the case where the feed sensor 207 detects a hole in the preceding original while the advance feed state is "judging" or "feeding". The feeding of the succeeding original is started when the detection of a hole is ended.

The reader CPU 301 next determines whether or not the feed sensor 207 is in the "off" state (S109). In the case of FIG. 4A, the reader CPU 301 detects that the feed sensor 207 is in the "off" state ("YES" in S109) when an original hole leading edge HLE passes the feed sensor 207. When the feed sensor 207 is in the "off" state ("YES" in S109), the reader CPU 301 starts counting to measure a first conveyance distance L1 of the original as a distance by which the original has been conveyed since the detection of the "off" state of the feed sensor 207 (S110). The first conveyance distance L1 is measured through counting by a first counter (first distance detector) 321, which is connected to the reader CPU 301. The reader CPU 301 can measure the first conveyance distance L1 by counting pulses that drive the conveyance motor 306 with the use of the first counter 321.

The reader CPU 301 determines whether or not the first conveyance distance L1 has reached a hole detection distance D (S111). A conveyance time required to convey an original by the given hole detection distance D is referred to as "hole detection time $T_D$". The hole detection distance D is a distance longer than the length in the conveyance direction X of each original hole PH (FIG. 6) formed in an original, and shorter than an original-to-original distance E (FIG. 6) between the preceding original and the succeeding original that are conveyed in succession. The reader CPU 301 uses the hole detection distance D to determine whether or not an original has any original hole PH as described later. Whether or not the first conveyance distance L1 has reached the hole detection distance D is determined based on whether or not the count value of the first counter 321 has reached the hole detection time $T_D$. In the case where the first conveyance distance L1 is less than the hole detection distance D ("NO" in S111), the reader CPU 301 determines whether or not the feed sensor 207 is in the "on" state (S115).

In the case where the feed sensor 207 is not in the "on" state ("NO" in S115), the reader CPU 301 determines whether or not the advance feed state is "judging" (S119). The advance feed state in the beginning is "judging" ("YES" in S119), and the reader CPU 301 accordingly determines whether or not the second conveyance distance L2 has reached an advance feed determination distance (conveyance permission distance) L3 (S120).

The advance feed determination distance L3 is defined as follows:

Advance feed determination distance $L3$=predicted original distance+conveyance margin The predicted original distance is a distance along which an original is conveyed by the predicted original length. The conveyance margin is allowance for fluctuations in actual original length and fluctuations in conveyance speed, and is shorter than the hole detection distance D. The reader CPU 301 obtains the advance feed determination distance L3 from the predicted original distance. The reader CPU 301 uses the advance feed determination distance L3 as a conveyance permission distance to determine whether to start feeding the succeeding original or not as described above. A conveyance time required to convey an original by the advance feed determination distance L3 is given as an advance feed determination time $T_{L3}$. Whether or not the second conveyance distance L2 has reached the advance feed determination distance L3 is determined based on whether or not the count value of the second counter 322 has reached the advance feed determination time $T_{L3}$.

In the case where the predicted original length and the actual original length are equal to each other as in FIG. 4A, it can be determined that an original trailing edge TE is detected when the feed sensor 207 changes from the "on" state to the "off" state after the first conveyance distance L1 reaches the hole detection distance D. Counting for measuring the first conveyance distance L1 is started at the time when the "off" state of the feed sensor 207 is detected, and the second conveyance distance L2 reaches the advance feed determination distance L3 before the first conveyance distance L1 reaches the hole detection distance D. In the case where the predicted original length and the actual original length are equal to each other, it can be determined that the original trailing edge TE has already passed the feed sensor 207 by the time the second conveyance distance L2 reaches the advance feed determination distance L3.

In the case where the second conveyance distance L2 has not reached the advance feed determination distance L3 ("NO" in S120) in FIG. 3, the processing returns to S111. The reader CPU 301 determines whether or not the first conveyance distance L1 has reached the hole detection distance D (S111).

Figure 6:
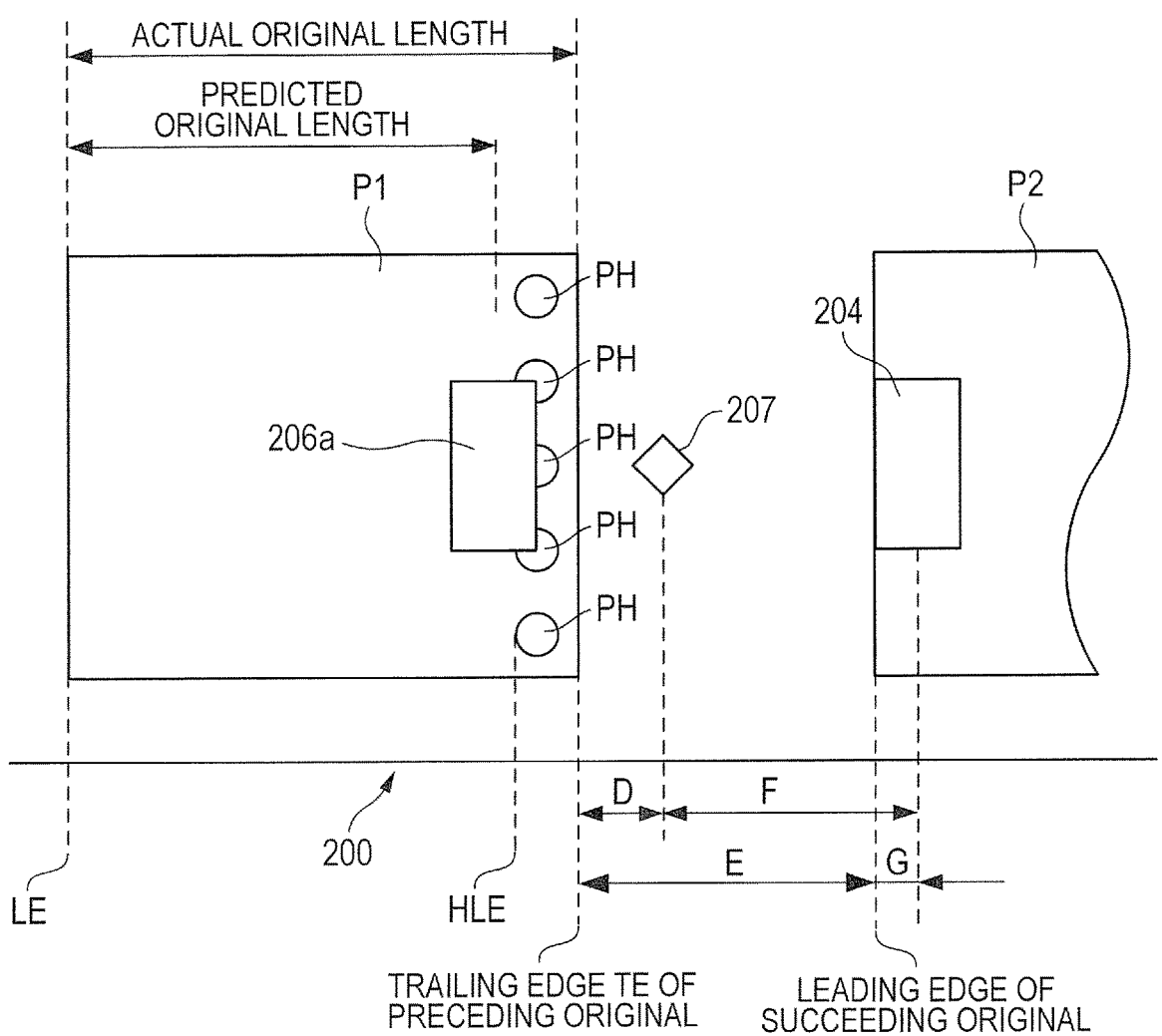
FIG. 6 is an explanatory diagram for illustrating a preceding original with holes and the succeeding original in an auto document feeder (ADF) viewed from above.

FIG. 6 is an explanatory diagram for illustrating a preceding original P1 with holes and a succeeding original P2 in the ADF 200 viewed from above. The preceding original P1 with holes have a plurality of original holes PH. In the case of FIG. 6, the predicted original length of the original P1 with holes is shorter than the actual original length of the original P1 with holes, and a distance from the original leading edge LE to the original hole leading edge HLE of each original hole PH is longer than the predicted original length. The hole detection distance D is shorter than the original-to-original distance E that is an assumed distance between the preceding original P1 with holes and the succeeding original P2 as illustrated in FIG. 6. The reader CPU 301 functions as a hole detector configured to detect an original hole by detecting that the feed sensor 207 has changed from the "off" state to the "on" state after the change of the feed sensor 207 from the "on" state to the "off" state and before the arrival of the first conveyance distance L1 of the original at the hole detection distance D. The original hole PH that is smaller in size than the hole detection distance can be detected through the control described above.

In the case of FIG. 4A, the reader CPU 301 detects that the feed sensor 207 is in the "off" state when the original hole leading edge HLE passes the feed sensor 207. Each original hole PH is located at a distance less than the advance feed determination distance L3 from the original leading edge LE. Referring to FIG. 3, the advance feed state at this point is "judging" ("YES" in S119). The reader CPU 301 determines whether or not the feed sensor 207 is in the "on" state (S115) before the second conveyance distance L2 reaches the advance feed determination distance L3 ("NO" in S120) and before the first conveyance distance L1 reaches the hole detection distance D ("NO" in S111).

When detecting that the feed sensor 207 is in the "on" state ("YES" in S115), the reader CPU 301 determines that an original hole has been detected, and determines whether or not the advance feed state is "feeding" (S116). The advance feed state at this point is not "feeding" ("NO" in S116), and the processing accordingly returns to S109. The reader CPU 301 determines whether or not the feed sensor 207 is in the "off" state (S109). The reader CPU 301 next detects the "off" state of the feed sensor 207 ("YES" in S109) when the original trailing edge TE passes the feed sensor 207. The reader CPU 301 starts counting to measure the first conveyance distance L1 (S110). The original trailing edge TE has already passed the feed sensor 207 at this point, and the predicted original length and the actual original length are equal to each other. Accordingly, the feed sensor 207 is not in the "on" state ("NO" in S115) before the first conveyance distance L1 reaches the hole detection distance D ("NO" in S111), and the advance feed state is "judging" ("YES" in S119). The reader CPU 301 determines that the second conveyance distance L2 has reached the advance feed determination distance L3 ("YES" in S120).

The reader CPU 301 engages the feed clutch 308 (S121), and starts conveying the succeeding original. The reader CPU 301 sets the advance feed state to "feeding" (S122). The processing returns to S111, where the reader CPU 301 determines whether or not the first conveyance distance L1 has reached the hole detection distance D (S111). The reader CPU 301 ultimately determines that the first conveyance distance L1 has reached the hole detection distance D ("YES" in S111). At this point (a point DEC), the determination that the original trailing edge has passed the feed sensor 207 at the time of detection of the "off" state of the feed sensor 207 is established.

The reader CPU 301 next determines whether or not the original presence/absence sensor 205 is in the "off" state (S112). In the case where the original presence/absence sensor 205 is not in the "off" state ("NO" in S112) due to the presence of the succeeding original, the reader CPU 301 determines whether or not the advance feed state is "feeding" (S123). In the case where the advance feed state is "feeding" ("YES" in S123), the processing returns to S104, where the reader CPU 301 directly proceeds to determining whether or not the feed sensor 207 has been turned on by the original leading edge of the succeeding original (S104).

In the case where the original presence/absence sensor 205 is in the "off" state ("YES" in S112) due to the absence of the succeeding original, on the other hand, the reader CPU 301 determines whether or not the advance feed state is "feeding" (S113). This time, the advance feed state is "feeding" ("YES" in S113), and the reader CPU 301 accordingly disengages the feed clutch 308 (S114) to stop the feed control, and then ends the feed control. After confirming that the feeding, reading, and discharge of the final original are completed in the feeding sequence, the reading sequence, and the discharge sequence, respectively, the reader CPU 301 ends the job running in the first reading mode.

Figure 4B:
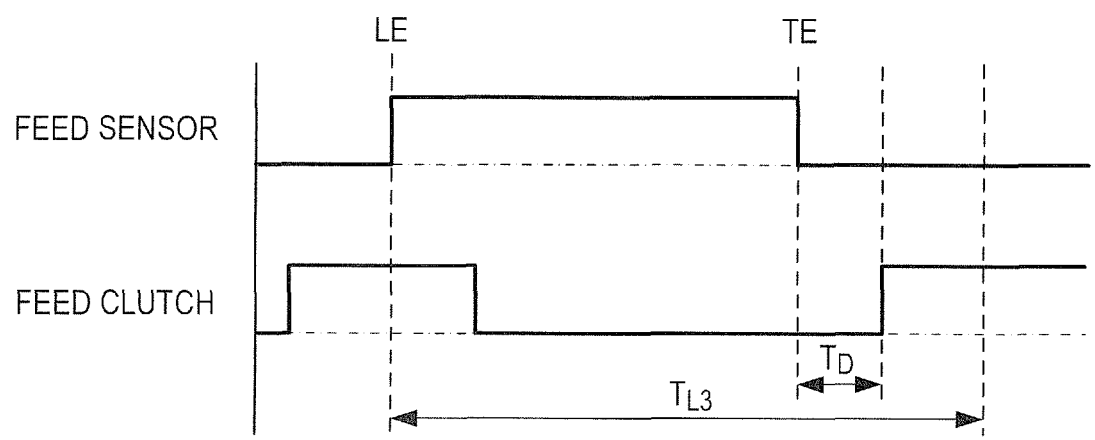

A feeding sequence that is described next with reference to FIG. 3 is for a case illustrated in FIG. 4B, where the predicted original length is longer than the combined length of the actual original length and the hole detection distance D. FIG. 4B is a timing chart for illustrating the operation timing of the feed sensor 207 and the feed clutch 308 that is observed in the advance feed control of the first embodiment when the predicted original length is longer than the combined length of the actual original length and the hole detection distance D. The flow from the start of the job until the cessation of feed control for the first sheet is the same as in the case described above, where an original with a hole whose actual original length is equal to the predicted original length is fed. The description given here therefore deals with the subsequent control.

After the feed control is ended, the reader CPU 301 sets the advance feed state of the succeeding original to "judging" (S108). The reader CPU 301 determines whether or not the feed sensor 207 is in the "off" state (S109). In the case of FIG. 4B, the reader CPU 301 starts counting when the original trailing edge TE passes the feed sensor 207, to measure the first conveyance distance L1 that has been traveled since the detection of the "off" state of the feed sensor 207 (S110). The actual original length is shorter than a length that is calculated by subtracting the hole detection distance D from the predicted original length, which means that the original trailing edge TE has passed the feed sensor 207 at this point. The first conveyance distance L1 is shorter than the hole detection distance D ("NO" in S111), the feed sensor 207 is in the "off" state ("NO" in S115), and the advance feed state is "judging" ("YES" in S119). The reader CPU 301 determines whether or not the second conveyance distance L2 has reached the advance feed determination distance L3 (S120). In the case of FIG. 4B, there is no chance that the "on" state of the feed sensor 207 is detected ("NO" in S115) before the second conveyance distance L2 reaches the advance feed determination distance L3 ("NO" in S120). The reader CPU 301 detects that the first conveyance distance L1 has reached the hole detection distance D ("YES" in S111), and determines that the original trailing edge TE has passed the feed sensor 207.

The reader CPU 301 next determines whether or not the original presence/absence sensor 205 is in the "off" state (S112). In the case where the original presence/absence sensor 205 is not in the "off" state ("NO" in S112) due to the presence of the succeeding original, the reader CPU 301 determines whether or not the advance feed state is "feeding" (S123). The advance feed state in this case is not "feeding" ("NO" in S123), and the reader CPU 301 accordingly engages the feed clutch 308 (S124) to start feeding the succeeding original. The processing returns to S104, where the reader CPU 301 determines whether or not the feed sensor 207 has been turned on by the original leading edge of the succeeding original (S104).

In the case where the original presence/absence sensor 205 is in the "off" state ("YES" in S112) due to the absence of the succeeding original, on the other hand, the reader CPU 301 determines whether or not the advance feed state is "feeding" (S113). The advance feed state in this case is not "feeding" ("NO" in S113), and the feed control is accordingly ended without executing further S. After confirming that the feeding, reading, and discharge of the final original are completed in the feeding sequence, the reading sequence, and the discharge sequence, respectively, the reader CPU 301 ends the reading job in the first reading mode.

Figure 5A:
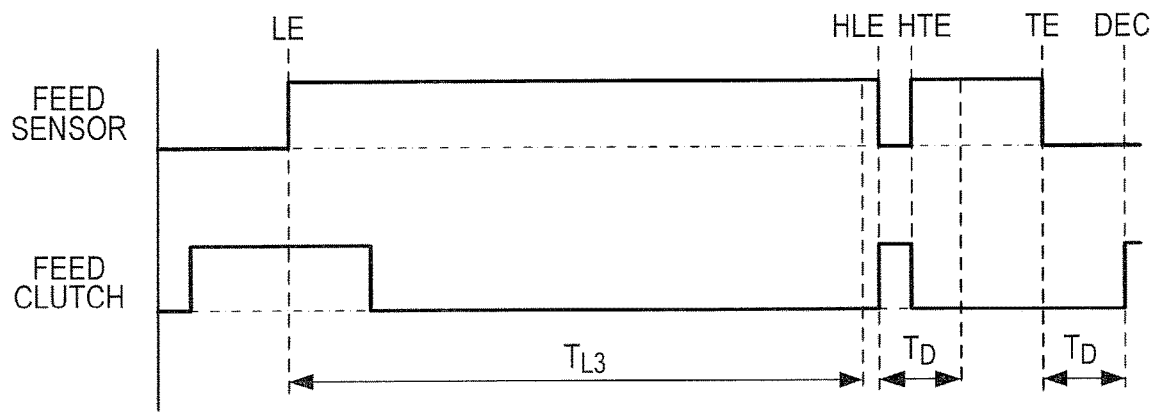
FIG. 5A and FIG. 5B are timing charts for illustrating the operation of the feed sensor and the feed clutch in the first embodiment.

A feeding sequence that is described next with reference to FIG. 3 is for a case illustrated in FIG. 5A, where the predicted original length is shorter than the actual original length and a distance from the original leading edge LE to the original hole leading edge HLE is longer than the predicted original length. FIG. 5A is a timing chart for illustrating the operation timing of the feed sensor 207 and the feed clutch 308 that is observed in the advance feed control of the first embodiment when the predicted original length is shorter than the actual original length and a distance from the original leading edge LE to the original hole leading edge HLE is longer than the predicted original length. The flow from the start of the job until the cessation of feed control for the first sheet is the same as in the case described above, where an original with a hole whose actual original length is equal to the predicted original length is fed. The description given here therefore deals with the subsequent control.

After the feed control is ended, the reader CPU 301 sets the advance feed state of the succeeding original to "judging" (S108). The reader CPU 301 determines whether or not the feed sensor 207 is in the "off" state (S109). The reader CPU 301 detects that the feed sensor 207 is in the "off" state ("YES" in S109) when the original hole leading edge HLE passes the feed sensor 207. In the case where the feed sensor 207 is in the "off" state ("YES" in S109), the reader CPU 301 starts counting to measure the first conveyance distance L1 that has been traveled since the detection of the "off" state of the feed sensor 207 (S110).

In the case of FIG. 5A, the distance from the original leading edge LE to the original hole leading edge HLE is longer than the advance feed determination distance L3. The advance feed state before the first conveyance distance L1 reaches the hole detection distance D ("NO" in S111) and before it is detected that the feed sensor 207 is in the "on" state ("NO" in S115) is "judging" ("YES" in S119). The reader CPU 301 detects that the second conveyance distance L2 has reached the advance feed determination distance L3 ("YES" in S120). The reader CPU 301 engages the feed clutch 308 (S121) to start conveying the succeeding original. The reader CPU 301 sets the advance feed state to "feeding" (S122). The processing returns to S111, where the reader CPU 301 determines whether or not the first conveyance distance L1 has reached the hole detection distance D (S111).

The reader CPU 301 detects that the feed sensor 207 is in the "on" state ("YES" in S115) when an original hole trailing edge HTE passes the feed sensor 207 before the first conveyance distance L1 reaches the hole detection distance D ("NO" in S111). The advance feed state at this point is "feeding" ("YES" in S116), and the reader CPU 301 accordingly disengages the feed clutch 308 (S117) to stop conveying the succeeding original. Thereafter, the reader CPU 301 sets the advance feed state to "stopped" (S118), and the processing returns to S109. The reader CPU 301 determines whether or not the feed sensor 207 is in the "off" state (S109).

When the original trailing edge TE passes the feeding sensor 207, the reader CPU 301 detects that the feed sensor 207 is in the "off" state ("YES" in S109). The reader CPU 301 starts counting to measure the first conveyance distance L1 (S110). At this point, the original trailing edge TE has already passed the feed sensor 207, which means that there is no chance that the "on" state of the feed sensor 207 is detected by the reader CPU 301 ("NO" in S115). Further, the reader CPU 301 does not engage the feed clutch 308 even when the second conveyance distance L2 reaches the advance feed determination distance L3 because the advance feed state is "stopped" and not "judging" ("NO" in S119).

The reader CPU 301 ultimately determines that the first conveyance distance L1 has reached the hole detection distance D ("YES" in S111). At this point (DEC), the determination that the original trailing edge TE has passed the feed sensor 207 at the time of detection of the "off" state of the feed sensor 207 is established. The reader CPU 301 next determines whether or not the original presence/absence sensor 205 is in the "off" state (S112). In the case where the original presence/absence sensor 205 is not in the "off" state ("NO" in S112) due to the presence of the succeeding original, the reader CPU 301 determines whether or not the advance feed state is "feeding" (S123). The advance feed state in this case is not "feeding" ("NO" in S123), and the reader CPU 301 accordingly engages the feed clutch 308 (S124) to start feeding the succeeding original. The processing returns to S104, where the reader CPU 301 determines whether or not the feed sensor 207 has been turned on by the original leading edge of the succeeding original (S104).

In the case where the original presence/absence sensor 205 is in the "off" state ("YES" in S112) due to the absence of the succeeding original, the reader CPU 301 determines whether or not the advance feed state is "feeding" (S113). In the case of FIG. 5A, the advance feed state is not "feeding" ("NO" in S113), and the feed control is accordingly ended. After confirming that the feeding, reading, and discharge of the final original are completed in the feeding sequence, the reading sequence, and the discharge sequence, respectively, the reader CPU 301 ends the reading job in the first reading mode.

Figure 5B:
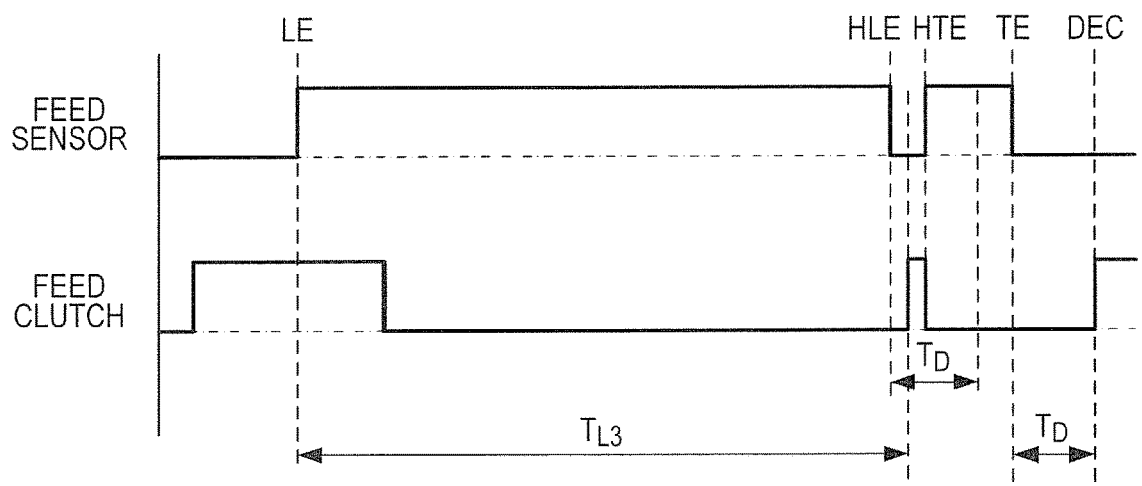

A feeding sequence that is described next with reference to FIG. 3 is for a case illustrated in FIG. 5B, where the predicted original length is shorter than the actual original length and a distance from the original leading edge LE to the original hole leading edge HLE is shorter than the predicted original length. FIG. 5B is a timing chart for illustrating the operation timing of the feed sensor 207 and the feed clutch 308 that is observed in the advance feed control of the first embodiment when the predicted original length is shorter than the actual original length and a distance from the original leading edge LE to the original hole leading edge HLE is shorter than the predicted original length. The flow from the start of the job until the cessation of feed control for the first sheet is the same as in the case described above, where an original with a hole whose actual original length is equal to the predicted original length is fed. The description given here therefore deals with the subsequent control.

After the feed control is ended, the reader CPU 301 sets the advance feed state of the succeeding original to "judging" (S108). The reader CPU 301 determines whether or not the feed sensor 207 is in the "off" state (S109). The reader CPU 301 detects that the feed sensor 207 is in the "off" state ("YES" in S109) when the original hole leading edge HLE passes the feed sensor 207. In the case where the feed sensor 207 is in the "off" state ("YES" in S109), the reader CPU 301 starts counting to measure the first conveyance distance L1 that has been traveled since the detection of the "off" state of the feed sensor 207 (S110).

In the case of FIG. 5B, the distance from the original leading edge LE to the original hole leading edge HLE is shorter than the advance feed determination distance L3.

The advance feed state before the first conveyance distance L1 reaches the hole detection distance D ("NO" in S111) and before it is detected that the feed sensor 207 is in the "off" state ("NO" in S115) is "judging" ("YES" in S119). The reader CPU 301 determines whether or not the second conveyance distance L2 has reached the advance feed determination distance L3 (S120). In the case where the second conveyance distance L2 has not reached the advance feed determination distance L3 ("NO" in S120), the processing returns to S111 to repeat the same processing until the second conveyance distance L2 reaches the advance feed determination distance L3. When the second conveyance distance L2 reaches the advance feed determination distance L3 ("YES" in S120), the reader CPU 301 engages the feed clutch 308 (S121) to start conveying the succeeding original. Thereafter, the reader CPU 301 sets the advance feed state to "feeding" (S122). The processing returns to S111, where the reader CPU 301 determines whether or not the first conveyance distance L1 has reached the hole detection distance D (S111).

The reader CPU 301 next detects that the feed sensor 207 is in the "on" state ("YES" in S115) when the original hole trailing edge HTE passes the feed sensor 207. The advance feed state at this point is "feeding" ("YES" in S116), and the reader CPU 301 accordingly disengages the feed clutch 308 (S117) to stop conveying the succeeding original. Thereafter, the reader CPU 301 sets the advance feed state to "stopped" (S118), and the processing returns to S109. The reader CPU 301 determines whether or not the feed sensor 207 is in the "off" state (S109).

The reader CPU 301 next detects that the feed sensor 207 is in the "off" state ("YES" in S109) when the original trailing edge TE passes the feed sensor 207. The reader CPU 301 starts counting to measure the first conveyance distance L1 (S110). At this point, the original trailing edge TE has already passed the feed sensor 207, and there is no chance that the "on" state of the feed sensor 207 is detected by the reader CPU 301 ("NO" in S115). Further, the reader CPU 301 does not engage the feed clutch 308 even when the second conveyance distance L2 has reached the advance feed determination distance L3 because the advance feed state is "stopped" ("NO" in S119).

The reader CPU 301 ultimately detects that the first conveyance distance L1 has reached the hole detection distance D ("YES" in S111). The determination that the original trailing edge TE has passed the feed sensor 207 at the time of detection of the "off" state of the feed sensor 207 is established (DEC). At this point (DEC), the reader CPU 301 engages the feed clutch 308 (S124) to start feeding the succeeding original in the case where the succeeding original is present ("NO" in S112). In the case where the succeeding original is absent ("YES" in S112), the reader CPU 301 ends the feed control.

FIG. 7A, FIG. 7B, and FIG. 7C are explanatory diagrams for illustrating a preceding original P1 with a hole and a succeeding original P2 in the first embodiment. FIG. 7A is an explanatory diagram for illustrating the positional relation between the original P1 and the succeeding original P2 that is observed in the first embodiment when an original with a hole whose actual original length is equal to the predicted original length is fed. FIG. 7B is an explanatory diagram for illustrating the positional relation between the original P1 and the succeeding original P2 that is observed in the first embodiment when the predicted original length is longer than the combined length of the actual original length and the hole detection distance D. FIG. 7C is an explanatory diagram for illustrating the positional relation between the original P1 and the succeeding original P2 that is observed in feed control of the related art when the predicted original length is longer than the combined length of the actual original length and the hole detection distance D.

In the case where the original hole is located at a distance equal to or shorter than the predicted original length and the actual original length is equal to or longer than the predicted original length, the turning off of the feed sensor 207 by the original hole is ignored and the feeding of the succeeding original P2 can be started as soon as the turning off of the feed sensor 207 by the original trailing edge is detected as illustrated in FIG. 7A. An original-to-original distance E1 between the original P1 and the succeeding original P2 therefore equals a distance F between the pickup roller 204 and the feed sensor 207. In other words, in the case of scanning the original P1 that is exactly the same size as an original size set by the user, the succeeding original P2 can be fed at the minimum original-to-original distance E1.

When the actual original length is shorter than the predicted original length, it is difficult to discriminate the original trailing edge from an original hole and, for that reason, the succeeding original P2 is fed after the detection processing is ended as illustrated in FIG. 7B. An original-to-original distance E2 between the original P1 and the succeeding original P2 therefore equals the combined distance of the distance F between the pickup roller 204 and the feed sensor 207 and the hole detection distance D. The original-to-original distance E2 is longer than the original-to-original distance E1 by the hole detection distance D. However, in the method of the related art where the feeding of the succeeding original P2 is held back while the preceding original is conveyed for a distance equivalent to the predicted original length, an original-to-original distance E3 is a distance that is obtained by subtracting the actual original length from the predicted original length and adding the distance F between the pickup roller 204 and the feed sensor 207 to the resultant difference as illustrated in FIG. 7C. The succeeding original can thus be fed at a shorter original-to-original distance than in the method of the related art.

In the case where the original hole is located past a point where the predicted original length ends in a direction toward the original trailing edge, the original hole leading edge is mistaken as the original trailing edge and feeding is started erroneously as described above. However, the feeding is stopped when the original hole trailing edge is subsequently detected. The succeeding original P2 is consequently fed for a distance equivalent to the hole size from the position of the pickup roller 204 as illustrated in FIG. 6. In the case where the original hole leading edge is erroneously detected as the original trailing edge, the feeding of the succeeding original is not started when the "off" state of the feed sensor 207 is detected, and is started when the first conveyance distance L1 reaches the hole detection distance D. The original-to-original distance E is accordingly a distance that is obtained by subtracting a hole size G from the distance F between the pickup roller 204 and the feed sensor 207, and adding the resultant difference to the hole detection distance D as illustrated in FIG. 6. The maximum hole size G that is detectable in hole detection processing is the hole detection distance D, which means that the minimum original-to-original distance is the distance F between the pickup roller 204 and the feed sensor 207. This prevents the original-to-original distance from decreasing further than necessary even when the succeeding original is erroneously fed at the time of detection of the original hole.

According to the first embodiment, an original from which an image is to be read can be conveyed properly without reducing the original image reading processing performance.

Second Embodiment

A second embodiment of the present invention will be described below. In the second embodiment, the same structure as the one in the first embodiment is denoted by the same reference symbol in order to avoid a repetitive description. The automatic original reading apparatus 1 and the control system 10 in the second embodiment are the same as those in the first embodiment, and descriptions thereof are omitted. In the second embodiment, the reader CPU 301 determines the advance feed state based on a conveyance distance that has been traveled since the detection of the original leading edge by the read sensor 210.

Figures 8, 8A, 8B:
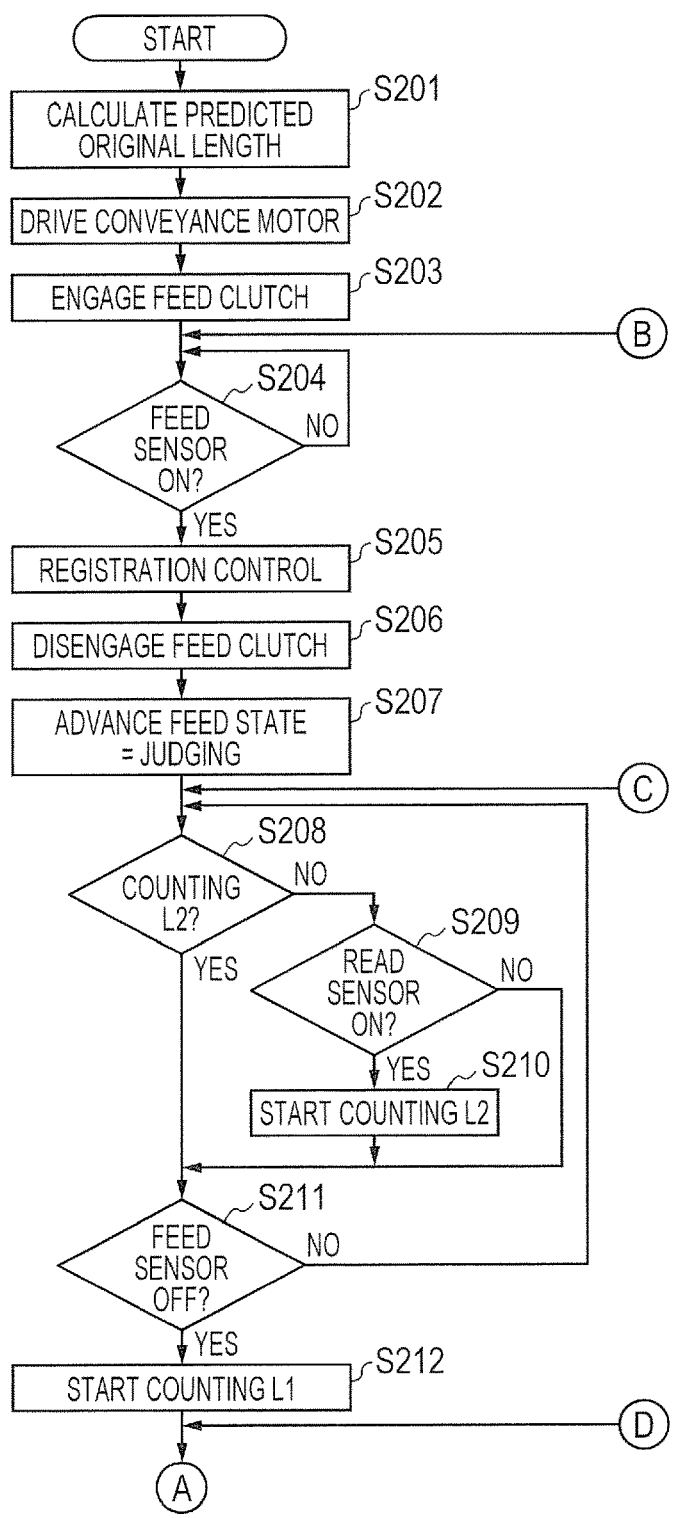
FIG. 8, comprised collectively of FIGS. 8A and 8B, is a flowchart for illustrating a feeding sequence of a second embodiment of the present invention.
Figure 8B:
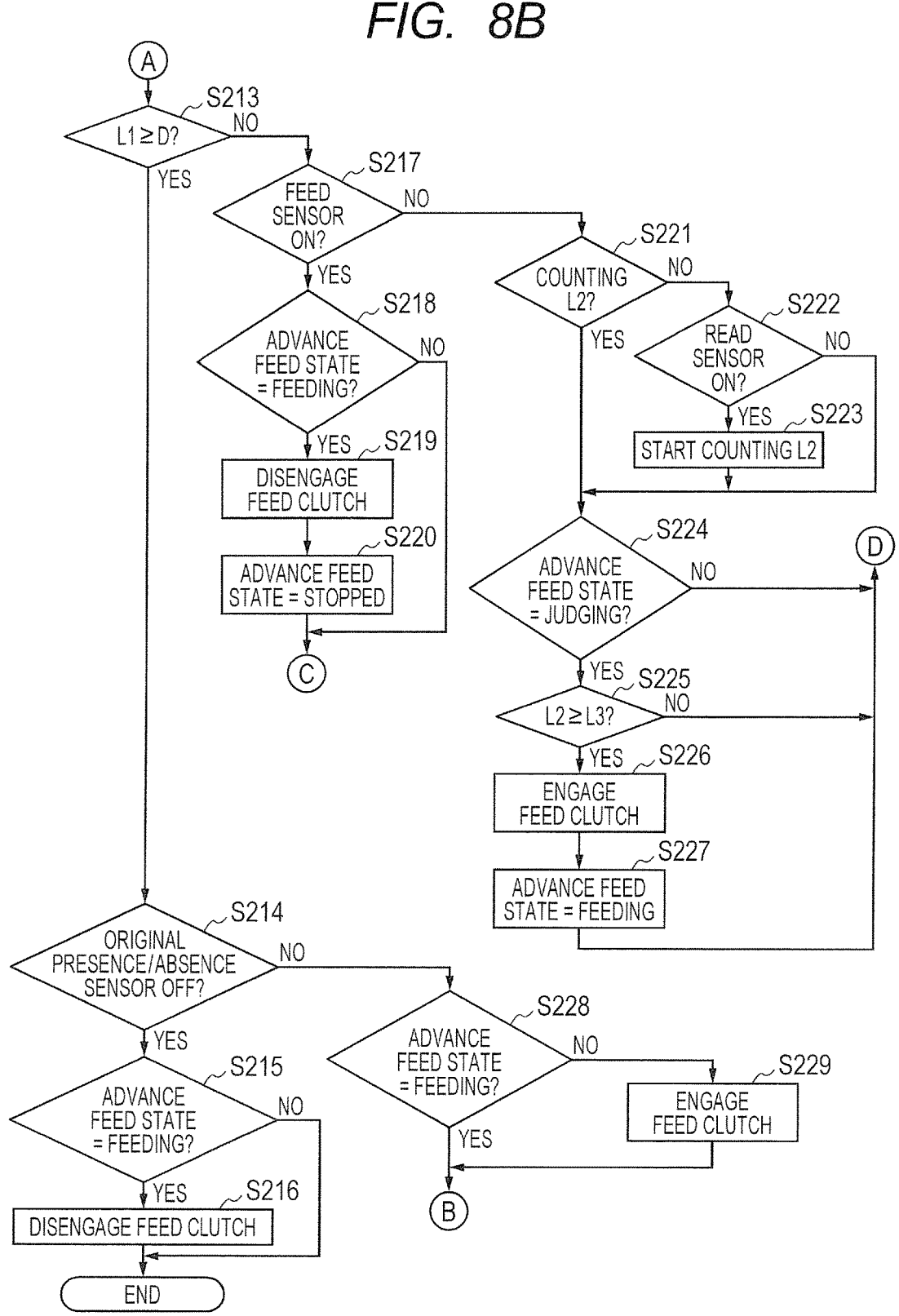

The reader CPU 301 parallelly processes a plurality of sequences including a reading sequence and a discharge sequence in addition to a feeding sequence during control in the first reading mode, to thereby read a plurality of originals while executing the conveyance of one original and the conveyance of another original at the same time. FIG. 8, comprised collectively of FIGS. 8A and 8B, is a flowchart for illustrating an original feeding sequence of the second embodiment. The reader CPU 301 executes the original feeding sequence as programmed by the program stored on the reader ROM 302. FIG. 9A, FIG. 9B, FIG. 9C, FIG. 10A, and FIG. 10B are timing charts for illustrating the operation of the read sensor 210, the feed sensor 207, and the feed clutch 308 in the second embodiment.

Figure 9A:
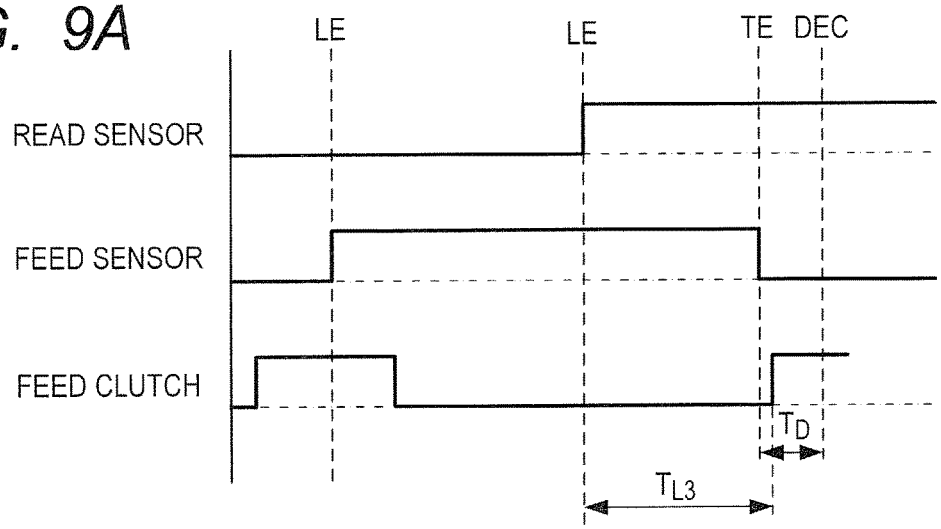
FIG. 9A, FIG. 9B, and FIG. 9C are timing charts for illustrating the operation of a read sensor, a feed sensor, and a feed clutch in the second embodiment.

The operation flow of an original feeding sequence in reading control performed in the first reading mode to which advance feed control of the second embodiment is applied will be described with reference to FIG. 8. A feeding sequence that is described first is for a case illustrated in FIG. 9A, where an original that is fed has an actual original length equal to the predicted original length, and turns the read sensor 210 on before the "off" state of the feed sensor 207 is detected. In the case illustrated in FIG. 9A, an original that is fed in the advance feed control of the second embodiment has an actual original length equal to the predicted original length, and turns the read sensor 210 on before the "off" state of the feed sensor 207 is detected. FIG. 9A is a timing chart for illustrating the operation timing of the feed sensor 207, the read sensor 210, and the feed clutch 308.

The reader CPU 301 activates the feeding sequence when the control of the ADF 200 in the first reading mode is started. When the feeding sequence is activated, the system controller 310 notifies an original size set by the user to the reader CPU 301. The reader CPU 301 calculates a predicted original length from the original size notified by the system controller 310 (S201). The reader CPU 301 next drives the conveyance motor 306 (S202), and engages the feed clutch 308 (S203). This causes the pickup roller 204 to drop down to the original surface, and the original is conveyed by rotating the separating roller pair 206.

The reader CPU 301 determines whether or not the feed sensor 207 has been turned on by the conveyed original (S204). When it is detected that the feed sensor 207 has been turned on ("YES" in S204), the reader CPU 301 executes registration control (S205). The registration control is accomplished by a known technology that is used to shape an original into a loop in the registration loop space 230. The original for which skew feed has been corrected by the registration control is conveyed to the first reading position. After the registration control is ended, the reader CPU 301 disengages the feed clutch 308 (S206), and stops feed control.

After the feed control is ended, the reader CPU 301 sets the advance feed state of the succeeding original to "judging" (S207). The reader CPU 301 next determines whether or not counting is being executed to measure the second conveyance distance L2 that has been traveled since the detection of the original leading edge by the read sensor 210 (S208). In the case where counting for measuring the second conveyance distance L2 is not being executed ("NO" in S208), the reader CPU 301 determines whether or not the read sensor 210 is in the "on" state (S209). When the read sensor 210 is turned on ("YES" in S209), the reader CPU 301 starts counting to measure the second conveyance distance L2 (S210). The second conveyance distance L2 is measured through counting by the second counter (second distance detector) 322, which is connected to the reader CPU 301. The reader CPU 301 can measure the second conveyance distance L2 by counting pulses that drive the conveyance motor 306 with the use of the second counter 322.

The reader CPU 301 determines whether or not the feed sensor 207 has been turned off (S211). The reader CPU 301 determines whether or not the feed sensor 207 has been turned off (S211) also when the read sensor 210 is not in the "on" state ("NO" in S209). When the feed sensor 207 is not in the "off" state ("NO" in S211), the processing returns to S208. The reader CPU 301 determines whether or not counting is being executed to measure the second conveyance distance L2 (S208).

In the case of FIG. 9A, the "on" state of the read sensor 210 is detected before the "off" state of the feed sensor 207 is detected. This means that the counting for measuring the second conveyance distance L2 is stopped at the time when the original leading edge LE passes the read sensor 210 ("NO" in S208). The reader CPU 301 detects that the read sensor 210 is in the "on" state ("YES" in S209), and starts counting to measure the second conveyance distance L2 (S210). The reader CPU 301 determines whether or not the feed sensor 207 is in the "off" state (S211). When the feed sensor 207 is turned off ("YES" in S211), the reader CPU 301 starts counting to measure the first conveyance distance L1 that has been traveled since the detection of the "off" state of the feed sensor 207 (S212). The first conveyance distance L1 is measured through counting by the first counter (first distance detector) 321, which is connected to the reader CPU 301. The reader CPU 301 can measure the first conveyance distance L1 by counting pulses that drive the conveyance motor 306 with the use of the first counter 321.

The reader CPU 301 determines whether or not the first conveyance distance L1 has reached the hole detection distance D (S213). When the first conveyance distance L1 is less than the hole detection distance D ("NO" in S213), the reader CPU 301 determines whether or not the feed sensor 207 is in the "on" state (S217). In the case where the feed sensor 207 is not in the "on" state ("NO" in S217), the reader CPU 301 determines whether or not counting is being executed to measure the second conveyance distance L2 (S221). In the case where the counting for measuring the second conveyance distance L2 is being executed ("YES" in S221), the reader CPU 301 determines whether or not the advance feed state is "judging" (S224). In the case where the counting for measuring the second conveyance distance L2 is not being executed ("NO" in S221), the reader CPU 301 determines whether or not the read sensor 210 is in the "on"

state (S222). In the case where the read sensor 210 is in the "on" state ("YES" in S222), the reader CPU 301 starts counting to measure the second conveyance distance L2 (S223).

The reader CPU 301 determines whether or not the advance feed state is "judging" (S224). When the advance feed state is "judging" ("YES" in S224), the reader CPU 301 determines whether or not the second conveyance distance L2 has reached the advance feed determination distance (conveyance permission distance) L3 (S225). The counting for measuring the second conveyance distance L2 is started at the time when the read sensor 210 is turned on. The advance feed determination distance L3 is therefore determined as follows:

Advance feed determination distance L3=predicted original distance−feed sensor-read sensor distance+conveyance margin The predicted original distance is a distance along which an original is conveyed by the predicted original length. The feed sensor-read sensor distance is a distance between the feed sensor 207 and the read sensor 210. The conveyance margin is allowance for fluctuations in actual original length and fluctuations in conveyance speed, and is shorter than the hole detection distance D.

In the case where the second conveyance distance L2 has not reached the advance feed determination distance L3 ("NO" in S225), the processing returns to S213. The reader CPU 301 determines whether or not the first conveyance distance L1 has reached the hole detection distance D (S213). In the case of FIG. 9A, the actual original length is equal to the predicted original length, and the read sensor 210 is turned on before the "off" state of the feed sensor 207 is detected. Accordingly, there is no chance that the "on" state of the feed sensor 207 is detected ("NO" in S217) before the first conveyance distance L1 reaches the hole detection distance D ("NO" in S213), and the counting for measuring the second conveyance distance L2 is ongoing ("YES" in S221). The advance feed state remains "judging" ("YES" in S224) as well. The reader CPU 301 determines whether or not the second conveyance distance L2 has reached the advance feed determination distance L3 (S225).

When it is determined that the second conveyance distance L2 has reached the advance feed determination distance L3 ("YES" in S225), the reader CPU 301 engages the feed clutch 308 (S226) to start conveying the succeeding original. The reader CPU 301 sets the advance feed state of the succeeding original to "feeding" (S227). The processing returns to S213. The reader CPU 301 determines whether or not the first conveyance distance L1 has reached the hole detection distance D (S213). The reader CPU 301 ultimately detects that the first conveyance distance L1 has reached the hole detection distance D ("YES" in S213). The determination that the original trailing edge has passed the feed sensor 207 at the time of detection of the "off" state of the feed sensor 207 is established at this point (DEC).

The reader CPU 301 next determines whether or not the original presence/absence sensor 205 is in the "off" state (S214). In the case where the original presence/absence sensor 205 is not in the "off" state ("NO" in S214) due to the presence of the succeeding original, the reader CPU 301 determines whether or not the advance feed state is "feeding" (S228). The advance feed state in this case is not "feeding" ("NO" in S228), and the reader CPU 301 accordingly engages the feed clutch 308 (S229) to start feeding the succeeding original. The processing returns to S204. The reader CPU 301 determines whether or not the feed sensor 207 has been turned on by the original leading edge of the succeeding original (S204).

In the case where the original presence/absence sensor 205 is in the "off" state ("YES" in S214) due to the absence of the succeeding original, on the other hand, the reader CPU 301 determines whether or not the advance feed state is "feeding" (S215). This time, the advance feed state is "feeding" ("YES" in S215), and the reader CPU 301 accordingly disengages the feed clutch 308 (S216) to stop the feed operation, and then ends the feed control. After confirming that the feeding, reading, and discharge of the final original are completed in the feeding sequence, the reading sequence, and the discharge sequence, respectively, the reader CPU 301 ends the reading job in the first reading mode.

Figure 9B:
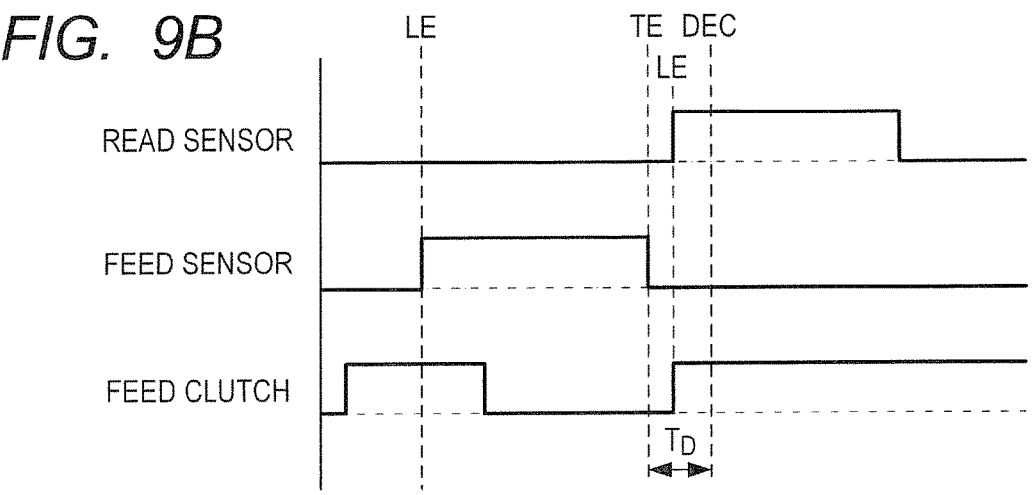

A feeding sequence that is described next with reference to FIG. 8 is for a case illustrated in FIG. 9B, where the actual original length is equal to the predicted original length and the "on" state of the read sensor 210 is detected during hole detection processing. In the case illustrated in FIG. 9B, an original that is fed in the advance feed control of the second embodiment has an actual original length equal to the predicted original length, and turns the read sensor 210 on during hole detection. FIG. 9B is a timing chart for illustrating the operation timing of the feed sensor 207, the read sensor 210, and the feed clutch 308. The flow from the start of the job until the cessation of feed control for the first sheet is the same as in the case where the predicted original length is equal to the actual original length, and the read sensor 210 is turned on before the "off" state of the feed sensor 207 is detected. The description given here therefore deals with the subsequent control.

After the feed control is ended, the reader CPU 301 sets the advance feed state of the succeeding original to "judging" (S207). In the case of FIG. 9B, the reader CPU 301 detects the "on" state of the read sensor 210 after detecting that the feed sensor 207 has been turned off. The reader CPU 301 accordingly has not started counting to measure the second conveyance distance L2 ("NO" in S208) at the time when the original trailing edge TE passes the feed sensor 207. The read sensor 210 is not in the "on" state ("NO" in S209), and the feed sensor 207 is turned off ("YES" in S211).

The reader CPU 301 next starts counting at the time when the "off" state of the feed sensor 207 is detected to measure the first conveyance distance L1 (S212). In the case of FIG. 9B, the predicted original length is equal to the actual original length, and the read sensor 210 is turned on during the hole detection time $T_D$. Consequently, the "on" state of the feed sensor 207 is not detected ("NO" in S217) by the reader CPU 301 before the first conveyance distance L1 reaches the hole detection distance D ("NO" in S213) when the original leading edge LE reaches the read sensor 210. The reader CPU 301 has not started the counting for measuring the second conveyance distance L2 ("NO" in S221), and starts counting when the "on" state of the read sensor 210 is detected ("YES" in S222) to measure the second conveyance distance L2 (S223).

The advance feed state of the succeeding original is "judging" ("YES" in S224), and the reader CPU 301 accordingly determines whether or not the second conveyance distance L2 has reached the advance feed determination distance L3 (S225). The fact that the "on" state of the read sensor 210 has been detected after the detection of the "off" state of the feed sensor 207 indicates that the actual original length is shorter than the feed sensor-read sensor distance.

The advance feed determination distance L3 is therefore zero in the case of FIG. 9B. The reader CPU 301 accordingly determines that the second conveyance distance L2 has reached the advance feed determination distance L3 ("YES" in S225) immediately after starting the counting for measuring the second conveyance distance L2. The reader CPU 301 engages the feed clutch 308 (S226) to start conveying the succeeding original. The reader CPU 301 sets the advance feed state of the succeeding original to "feeding" (S227). The processing returns to S213. The reader CPU 301 determines whether or not the first conveyance distance L1 has reached the hole detection distance D (S213). The reader CPU 301 ultimately detects that the first conveyance distance L1 has reached the hole detection distance D ("YES" in S213). The determination that the original trailing edge TE has passed the feed sensor 207 at the time of detection of the "off" state of the feed sensor 207 is established at this point (DEC).

The reader CPU 301 next determines whether or not the original presence/absence sensor 205 is in the "off" state (S214). In the case where the original presence/absence sensor 205 is not in the "off" state ("NO" in S214) due to the presence of the succeeding original, the reader CPU 301 determines whether or not the advance feed state is "feeding" (S228). When the advance feed state is "feeding" ("YES" in S228), the processing returns to S204, where the reader CPU 301 determines whether or not the feed sensor 207 has been turned on by the original leading edge of the succeeding original (S204).

In the case where the original presence/absence sensor 205 is in the "off" state ("YES" in S214) due to the absence of the succeeding original, on the other hand, the reader CPU 301 determines whether or not the advance feed state is "feeding" (S215). In the case of FIG. 9B, the advance feed state is "feeding" ("YES" in S215), and the reader CPU 301 accordingly disengages the feed clutch 308 (S216) to stop the feed control, and then ends the feed control. After confirming that the feeding, reading, and discharge of the final original are completed in the feeding sequence, the reading sequence, and the discharge sequence, respectively, the reader CPU 301 ends the reading job in the first reading mode.

Figure 9C:
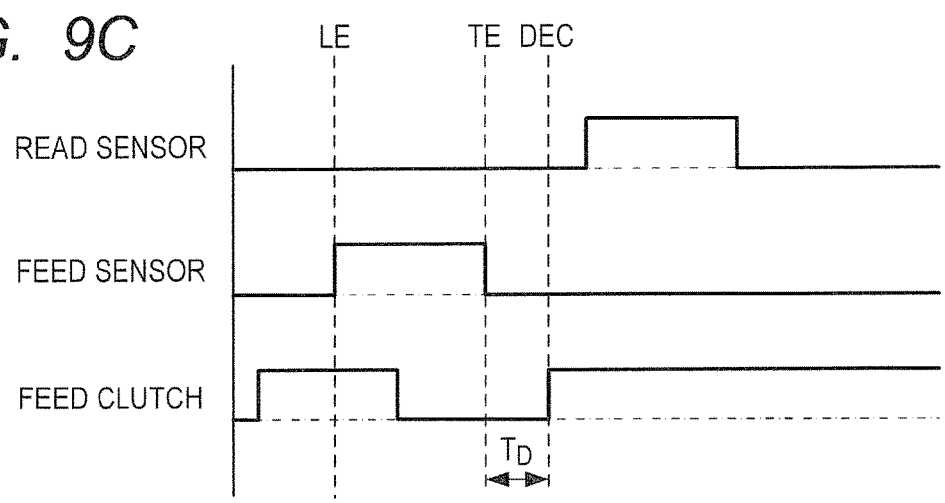

A feeding sequence that is described next with reference to FIG. 8 is for a case illustrated in FIG. 9C, where an original that is fed has an actual original length equal to the predicted original length, and turns the read sensor 210 on after hole detection processing is ended. In the case illustrated in FIG. 9C, an original that is fed in the advance feed control of the second embodiment has an actual original length equal to the predicted original length, and turns the read sensor 210 on after hole detection is ended. FIG. 9C is a timing chart for illustrating the operation timing of the feed sensor 207, the read sensor 210, and the feed clutch 308. The flow from the start of the job until the cessation of feed control for the first sheet is the same as in the case where the predicted original length is equal to the actual original length, and the read sensor 210 is turned on before the "off" state of the feed sensor 207 is detected. The description given here therefore deals with the subsequent control.

After the feed control is ended, the reader CPU 301 sets the advance feed state of the succeeding original to "judging" (S207). In the case of FIG. 9C, the reader CPU 301 detects the "on" state of the read sensor 210 after detecting that the feed sensor 207 has been turned off. The reader CPU 301 has not started counting to measure the second conveyance distance L2 ("NO" in S208) at the time when the original trailing edge TE passes the feed sensor 207. The reader CPU 301 detects that the feed sensor 207 is in the "off" state ("YES" in S211), without detecting the "on" state of the read sensor 210 ("NO" in S209).

The reader CPU 301 starts counting at the time when the "off" state of the feed sensor 207 is detected to measure the first conveyance distance L1 (S212). In the case of FIG. 9C, the predicted original length is equal to the actual original length, and the read sensor 210 is turned on after the hole detection time $T_D$ elapses. The reader CPU 301 therefore does not detect the "on" state of the feed sensor 207 ("NO" in S217), and is not executing the counting for measuring the second conveyance distance L2 ("NO" in S221). The reader CPU 301 does not detect the "on" state of the read sensor 210 ("NO" in S222), and ultimately detects that the first conveyance distance L1 has reached the hole detection distance D ("YES" in S213). The determination that the original trailing edge TE has passed the feed sensor 207 at the time of detection of the "off" state of the feed sensor 207 is established at this point (DEC).

The reader CPU 301 determines whether or not the original presence/absence sensor 205 is in the "off" state (S214). In the case where the original presence/absence sensor 205 is not in the "off" state ("NO" in S214) due to the presence of the succeeding original, the reader CPU 301 determines whether or not the advance feed state is "feeding" (S228). The advance feed state in this case is not "feeding" ("NO" in S228), and the reader CPU 301 accordingly engages the feed clutch 308 (S229) to start feeding the succeeding original. The processing returns to S204, where the reader CPU 301 determines whether or not the feed sensor 207 has been turned on by the original leading edge of the succeeding original (S204).

In the case where the original presence/absence sensor 205 is in the "off" state ("YES" in S214) due to the absence of the succeeding original, on the other hand, the reader CPU 301 determines whether or not the advance feed state is "feeding" (S215). In the case of FIG. 9C, the advance feed state is not "feeding" ("NO" in S215), and the reader CPU 301 accordingly ends the feed control. After confirming that the feeding, reading, and discharge of the final original are completed in the feeding sequence, the reading sequence, and the discharge sequence, respectively, the reader CPU 301 ends the reading job in the first reading mode.

As described above, in the case where the "on" state of the read sensor 210 is detected before the detection of the "off" state of the feed sensor 207 (FIG. 9A), that is, when "actual original length≥feed sensor-read sensor distance" is true, the operation in the second embodiment is the same as in the first embodiment. In the case where the "on" state of the read sensor 210 is detected during hole detection processing (the hole detection time $T_D$) (FIG. 9B), that is, when "actual original length<feed sensor-read sensor distance" is true, the conveyance of the succeeding original is started when the "on" state of the read sensor 210 is detected. In the case where the "on" state of the read sensor 210 is detected after the hole detection time $T_D$ elapses (FIG. 9C), that is, when "actual original length<feed sensor-read sensor distance-hole detection distance D" is true, the conveyance of the succeeding original is started after the hole detection time $T_D$ elapses.

In the case where when to start conveying the succeeding original is determined based on the second conveyance distance L2 that has been traveled since the detection of the original leading edge by the read sensor 210, and the actual original length is shorter than the feed sensor-read sensor distance (FIG. 9B), the image reading processing performance is lower than in the first embodiment. However, in the case where the second conveyance distance L2 that has been traveled since the detection of the original leading edge by the read sensor 210 is measured through counting, the counting for measuring the second conveyance distance L2 can be started after the registration processing. The registration processing may involve stopping the conveyance of due to the disengagement of the feed clutch 308, depending on how the registration processing is configured. This means that a miscount may occur in the case where the counting that counts pulses used to drive the conveyance motor 306 in order to measure the second conveyance distance L2 is started before the registration processing. In contrast, the unfavorable effect of the registration processing can be eliminated by starting the counting for measuring the second conveyance distance L2 at the time when a sensor provided in the downstream of the registration roller pair 208, for example, the read sensor 210, is turned on.

Figure 10A:
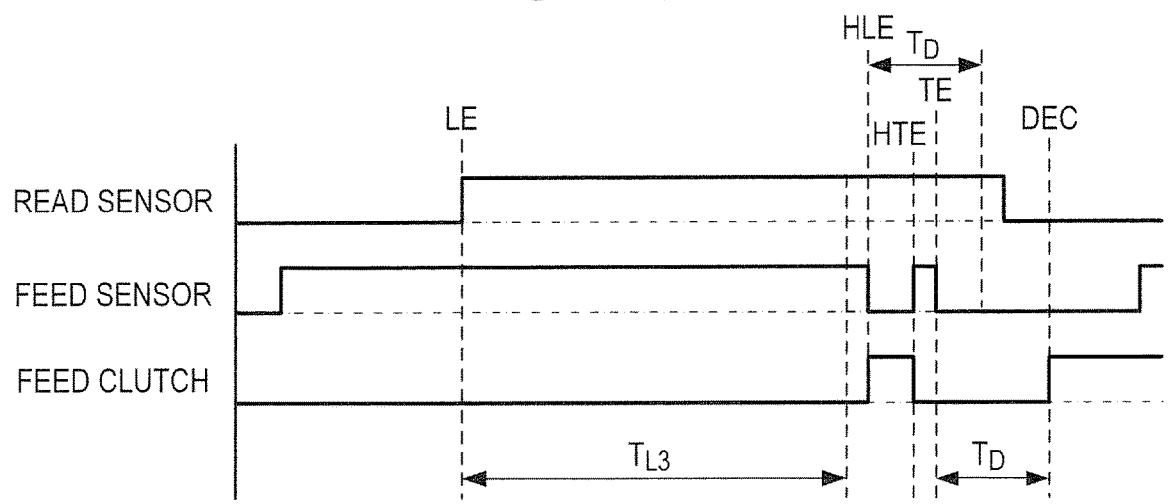
FIG. 10A and FIG. 10B are timing charts for illustrating the operation of the read sensor, the feed sensor, and the feed clutch in the second embodiment.

A feeding sequence that is described next with reference to FIG. 8 is for a case illustrated in FIG. 10A, where the predicted original length is shorter than the actual original length, and a distance from the original leading edge LE to the original hole leading edge HLE is longer than the predicted original length. The case illustrated in FIG. 10A is an example of the advance feed control of the second embodiment in which the predicted original length is shorter than the actual original length, and a distance from the original leading edge LE detected by the read sensor 210 to the original hole leading edge HLE detected by the feed sensor 207 is longer than the predicted original length. FIG. 10A is a timing chart for illustrating the operation timing of the read sensor 210, the feed sensor 207, and the feed clutch 308. The flow from the start of the job until the cessation of feed control for the first sheet is the same as in the case described above, where an original with a hole whose actual original length is equal to the predicted original length is fed. The description given here therefore deals with the subsequent control.

After the feed control is ended, the reader CPU 301 sets the advance feed state of the succeeding original to "judging" (S207). The reader CPU 301 determines whether or not the counting for measuring the second conveyance distance L2 is being executed (S208). The counting for measuring the second conveyance distance L2 is not being executed ("NO" in S208), and the reader CPU 301 accordingly determines whether or not the read sensor 210 is in the "on" state (S209). When the read sensor 210 is turned on ("YES" in S209), the reader CPU 301 starts counting to measure the second conveyance distance L2 (S210).

The reader CPU 301 determines whether or not the feed sensor 207 is in the "off" state (S211). The reader CPU 301 detects that the feed sensor 207 is in the "off" state ("YES" in S211) at the time when the original hole leading edge HLE passes the feed sensor 207. When the feed sensor 207 is in the "off" state ("YES" in S211), the reader CPU 301 starts counting to measure the first conveyance distance L1 that has been traveled since the detection of the "off" state of the feed sensor 207 (S212).

At this time, the distance from the original leading edge LE to the original hole leading edge HLE is longer than the advance feed determination distance L3. The counting for measuring the second conveyance distance L2 is being executed ("YES" in S221) before the first conveyance distance L1 reaches the hole detection distance D ("NO" in S213) and before it is detected that the feed sensor 207 is in the "on" state ("NO" in S217). The advance feed state is "judging" ("YES" in S224). The reader CPU 301 detects that the second conveyance distance L2 has reached the advance feed determination distance L3 ("YES" in S225). The reader CPU 301 engages the feed clutch 308 (S226) to start conveying the succeeding original. The reader CPU 301 sets the advance feed state to "feeding" (S227). The processing returns to S213. The reader CPU 301 determines whether or not the first conveyance distance L1 has reached the hole detection distance D (S213).

In the case of FIG. 10A, the original hole trailing edge HTE passes the feed sensor 207 before the first conveyance distance L1 reaches the hole detection distance D. The reader CPU 301 detects that the feed sensor 207 is in the "on" state ("YES" in S217) when the original hole trailing edge HTE passes the feed sensor 207. The advance feed state at this point is "feeding" ("YES" in S218), and the reader CPU 301 accordingly disengages the feed clutch 308 (S219) to stop conveying the succeeding original. The reader CPU 301 sets the advance feed state to "stopped" (S220). The processing returns to S208. The counting for measuring the second conveyance distance L2 is being executed ("YES" in S208), and the reader CPU 301 accordingly determines whether or not the feed sensor 207 is in the "off" state (S211).

The reader CPU 301 detects that the feed sensor 207 is in the "off" state ("YES" in S211) when the original trailing edge TE passes the feed sensor 207. The reader CPU 301 starts counting to measure the first conveyance distance L1 (S212). The original trailing edge TE has already passed the feed sensor 207 at this point, which means that the reader CPU 301 does not detect the "on" state of the feed sensor 207 ("NO" in S217). Further, the reader CPU 301 does not engage the feed clutch 308 even when the second conveyance distance L2 has reached the advance feed determination distance L3 because the counting for measuring the second conveyance distance L2 is being executed ("YES" in S221) and the advance feed state is "stopped" ("NO" in S224).

The reader CPU 301 ultimately detects that the first conveyance distance L1 has reached the hole detection distance D ("YES" in S213). The determination that the original trailing edge has passed the feed sensor 207 at the time of detection of the "off" state of the feed sensor 207 is established at this point (DEC). The reader CPU 301 determines whether or not the original presence/absence sensor 205 is in the "off" state (S214). In the case where the original presence/absence sensor 205 is not in the "off" state ("NO" in S214) due to the presence of the succeeding original, the reader CPU 301 determines whether or not the advance feed state is "feeding" (S228). The advance feed state at this point is not "feeding" ("NO" in S228), and the reader CPU 301 accordingly engages the feed clutch 308 (S229) to start feeding the succeeding original. The processing returns to S204. The reader CPU 301 determines whether or not the feed sensor 207 has been turned on by the original leading edge of the succeeding original (S204).

In the case where the original presence/absence sensor 205 is in the "off" state ("YES" in S214) due to the absence of the succeeding original, the reader CPU 301 determines whether or not the advance feed state is "feeding" (S215). The advance feed state at this point is not "feeding" ("NO" in S215), and the reader CPU 301 consequently ends the feed control. After confirming that the feeding, reading, and discharge of the final original are completed in the feeding sequence, the reading sequence, and the discharge sequence, respectively, the reader CPU 301 ends the reading job in the first reading mode.

Figure 10B:
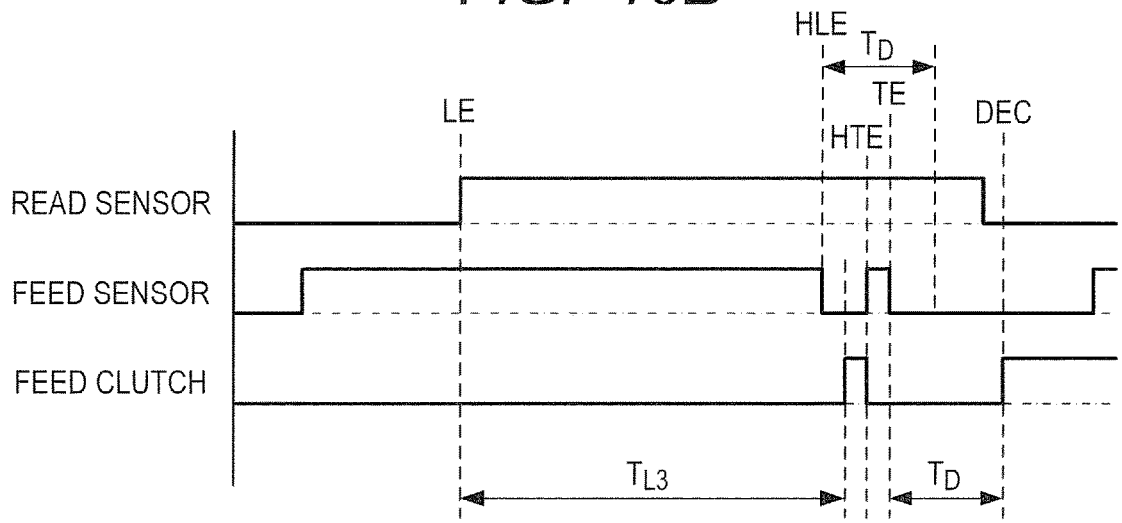

A feeding sequence that is described next with reference to FIG. 8 is for a case illustrated in FIG. 10B, where the predicted original length is shorter than the actual original length, and a distance from the original leading edge LE to the original hole leading edge HLE is shorter than the predicted original length. The case illustrated in FIG. 10B is an example of the advance feed control of the second embodiment in which the predicted original length is shorter than the actual original length, and a distance from the original leading edge LE detected by the read sensor 210 to the original hole leading edge HLE detected by the feed sensor 207 is shorter than the predicted original length. FIG. 10B is a timing chart for illustrating the operation timing of the read sensor 210, the feed sensor 207, and the feed clutch 308. The flow from the start of the job until the cessation of feed control for the first sheet is the same as in the case described above, where an original with a hole whose actual original length is equal to the predicted original length is fed. The description given here therefore deals with the subsequent control.

After the feed control is ended, the reader CPU 301 sets the advance feed state of the succeeding original to "judging" (S207). The reader CPU 301 determines whether or not counting is being executed to measure the second conveyance distance L2 that has been traveled since the detection of the original leading edge LE by the read sensor 210 (S208). The counting for measuring the second conveyance distance L2 is not being executed ("NO" in S208), and the reader CPU 301 accordingly determines whether or not the read sensor 210 is in the "on" state (S209). When the read sensor 210 is turned on ("YES" in S209), the reader CPU 301 starts counting to measure the second conveyance distance L2 (S210).

The reader CPU 301 determines whether or not the feed sensor 207 is in the "off" state (S211). The reader CPU 301 detects that the feed sensor 207 is in the "off" state ("YES" in S211) when the original hole leading edge HLE passes the feed sensor 207. When the feed sensor 207 is in the "off" state ("YES" in S211), the reader CPU 301 starts counting to measure the first conveyance distance L1 that has been traveled since the detection of the "off" state of the feed sensor 207 (S212).

In the case of FIG. 10B, the distance from the original leading edge LE detected by the read sensor 210 to the original hole leading edge HLE detected by the feed sensor 207 is shorter than the advance feed determination distance L3. In a period before the first conveyance distance L1 reaches the hole detection distance D ("NO" in S213) and before it is detected that the feed sensor 207 is in the "on" state ("NO" in S217), the counting for measuring the second conveyance distance L2 is being executed ("YES" in S221) and the advance feed state is "judging" ("YES" in S224). The reader CPU 301 determines whether or not the second conveyance distance L2 has reached the advance feed determination distance L3 (S225). In the case where the second conveyance distance L2 has not reached the advance feed determination distance L3 ("NO" in S225), the processing returns to S213. The same processing is repeated until the second conveyance distance L2 reaches the advance feed determination distance L3. When the second conveyance distance L2 reaches the advance feed determination distance L3 ("YES" in S225), the reader CPU 301 engages the feed clutch 308 (S226) to start conveying the succeeding original. The reader CPU 301 sets the advance feed state to "feeding" (S227). The processing returns to S213. The reader CPU 301 determines whether or not the first conveyance distance L1 has reached the hole detection distance D (S213).

In the case of FIG. 10B, the original hole trailing edge HTE passes the feed sensor 207 before the first conveyance distance L1 reaches the hole detection distance D. The reader CPU 301 detects that the feed sensor 207 is in the "on" state ("YES" in S217) when the original hole trailing edge HTE passes the feed sensor 207. The advance feed state at this point is "feeding" ("YES" in S218), and the reader CPU 301 accordingly disengages the feed clutch 308 (S219) to stop conveying the succeeding original. The reader CPU 301 sets the advance feed state to "stopped" (S220). The processing returns to S208. The counting for measuring the second conveyance distance L2 is being executed ("YES" in S208), and the reader CPU 301 accordingly determines whether or not the feed sensor 207 is in the "off" state (S211).

The reader CPU 301 detects that the feed sensor 207 is in the "off" state ("YES" in S211) when the original trailing edge TE passes the feed sensor 207. The reader CPU 301 starts counting to measure the first conveyance distance L1 (S212). The original trailing edge TE has already passed the feed sensor 207 at this point, which means that the reader CPU 301 does not detect the "on" state of the feed sensor 207 ("NO" in S217). Further, the reader CPU 301 does not engage the feed clutch 308 again even when the second conveyance distance L2 has reached the advance feed determination distance L3 because the counting for measuring the second conveyance distance L2 is being executed ("YES" in S221) and the advance feed state is "stopped" ("NO" in S224).

The reader CPU 301 ultimately detects that the first conveyance distance L1 has reached the hole detection distance D ("YES" in S213). The determination that the original trailing edge TE has passed the feed sensor 207 at the time of detection of the "off" state of the feed sensor 207 is established at this point (DEC). The reader CPU 301 engages the feed clutch 308 (S229) to start feeding the succeeding original in the case where the succeeding original is present ("NO" in S214). In the case where the succeeding original is absent ("YES" in S214), the reader CPU 301 ends the feed control.

According to the second embodiment, in the case of feeding an original that is exactly the same size as an original size specified by the user (FIG. 4A and FIG. 9A), the succeeding original can be conveyed immediately after the "off" state of the feed sensor is detected, without being affected by the original hole. This prevents a reduction in reading processing performance that is caused by hole detection processing. In addition, the same level of reading processing performance as in hole detection processing of the related art can be exerted when an original shorter than the specified size is loaded (FIG. 4B). In the case where an original longer than the specified size is loaded (FIG. 5A, FIG. 5B, FIG. 10A, and FIG. 10B), the conveyance of the succeeding original is sometimes erroneously started upon detection of an original hole, but is stopped when the original hole trailing edge HTE is detected. The conveyance of the succeeding original is resumed after the hole detection processing is completed, thereby accomplishing the successive reading of a plurality of images at the same level of reading processing performance as in the hole detection processing of the related art, without causing a paper jam.

According to the second embodiment, an original from which an image is to be read can be conveyed properly without reducing the original image reading processing performance.

A sheet feeding apparatus according to the first embodiment and the second embodiment is a document feeding apparatus configured to feed an original to a reading point where an image sensor reads the original, but may instead be a feeding apparatus configured to feed copy paper to an image forming portion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130384, filed Jun. 30, 2016, which is hereby incorporated by reference herein in its entirety.

What is claimed is:

1. An image reading apparatus, comprising:
an image sensor configured to read an image on an original;
an original tray on which the original is to be placed;
a conveyor configured to convey the original placed on the original tray to a reading position in which the image sensor reads the original;
an original length obtaining unit configured to obtain a length, in a conveyance direction, of the original that is placed on the original tray before the original is conveyed by the conveyor;
an original sensor provided between the original tray and the reading position and configured to assume a first state when the original sensor detects the original that is being conveyed by the conveyor and assume a second state when the original sensor does not detect the original;
a first distance detector configured to measure a first conveyance distance of the original by which the original has been conveyed from a time when the original sensor is changed from the first state to the second state;
a second distance detector configured to measure a second conveyance distance of the original by which the original has been conveyed from a time when the original sensor is changed from the second state to the first state before the original sensor is changed from the first state to the second state; and
a controller configured to control the conveyor so that:
the conveyor starts a conveyance of a succeeding original in a case where the succeeding original is on the original tray when the second conveyance distance reaches a second distance while the original sensor remains in the second state after the original sensor changes from the first state to the second state and before the first conveyance distance reaches a first distance, the second distance being a length obtained by adding a margin to the length of the original obtained by the original length obtaining unit, the first distance being longer than a size of a punch hole provided in the original and shorter than an interval in which a plurality of originals are conveyed; and
the conveyor suspends the conveyance of the succeeding original in a case where the original sensor changes from the second state to the first state after the conveyance of the succeeding original is started and before the first conveyance distance reaches the first distance, and thereafter restarts the conveyance of the succeeding original when the first conveyance distance reaches the first distance after the original sensor changes again from the first state to the second state.

2. The image reading apparatus according to claim 1, wherein the controller controls the conveyor so that the conveyor starts the conveyance of the succeeding original by the conveyor in a case where the succeeding original is on the original tray when the first conveyance distance reaches the first distance before the second conveyance distance reaches the second distance.

3. The image reading apparatus according to claim 1, further comprising a memory configured to store the first distance.

4. The image reading apparatus according to claim 1, wherein the original sensor outputs a high level voltage or current signal when the original sensor is in the first state, and outputs a low level voltage or current signal when the original sensor is in the second state.

5. An image reading apparatus, comprising:
an image sensor configured to read an image on an original;
an original tray on which the original is to be placed;
a conveyor configured to convey the original placed on the original tray to a reading position in which the image sensor reads the original;
an original length obtaining unit configured to obtain a length, in a conveyance direction, of the original that is placed on the original tray before the original is conveyed by the conveyor;
a first original sensor provided between the original tray and the reading position and configured to assume a first state when the first original sensor detects the original that is being conveyed by the conveyor and assume a second state when the first original sensor does not detect the original;
a second original sensor provided downstream of the first original sensor in the conveyance direction of the original between the original tray and the reading position and configured to assume a first state when the second original sensor detects the original that is being conveyed by the conveyor and assume a second state when the second original sensor does not detect the original;

a first distance detector configured to measure a first conveyance distance of the original by which the original has been conveyed from a time when the first original sensor is changed from the first state to the second state;

a second distance detector configured to measure a second conveyance distance of the original by which the original has been conveyed from a time when the second original sensor is changed from the second state to the first state before the first original sensor is changed from the first state to the second state; and a controller configured to control the conveyor so that:

the conveyor starts a conveyance of a succeeding original in a case where the succeeding original is on the original tray when the second conveyance distance reaches a second distance while the first original sensor remains in the second state after the first original sensor changes from the first state to the second state and before the first conveyance distance reaches a first distance, the second distance being a length obtained by adding a margin to the length of the original obtained by the original length obtaining unit, the first distance being longer than a size of a punch hole provided in the original and shorter than an interval in which a plurality of originals are conveyed; and the conveyor suspends the conveyance of the succeeding original in a case where the first original sensor changes from the second state to the first state after the conveyance of the succeeding original is started and before the first conveyance distance reaches the first distance, and thereafter restarts the conveyance of the succeeding original when the first conveyance distance reaches the first distance after the first original sensor changes again from the first state to the second state.

6. The image reading apparatus according to claim 5, further comprising a memory configured to store the first distance.

7. The image reading apparatus according to claim 5, wherein the first original sensor or the second original sensor outputs a high level voltage or current signal when the first original sensor or the second original sensor is in the first state, and wherein the first original sensor or the second original sensor outputs a low level voltage or current signal when the first original sensor or the second original sensor is in the second state.

8. The image reading apparatus according to claim 6, further comprising a registration roller pair configured to correct a skew feed of the original, wherein the second original sensor is provided downstream of the registration roller pair in the conveyance direction.

9. An image reading apparatus, comprising:

an image sensor configured to read an image on an original;

an original tray on which the original is to be placed;

a conveyor configured to convey the original placed on the original tray to a reading position in which the image sensor reads the original;

an original length obtaining unit configured to obtain a length, in a conveyance direction, of the original that is placed on the original tray before the original is conveyed by the conveyor;

an original sensor provided between the original tray and the reading position and configured to assume a first state when the original sensor detects the original that is being conveyed by the conveyor and assume a second state when the original sensor does not detect the original;

a first distance detector configured to measure a first conveyance distance of the original by which the original has been conveyed from a time when the original sensor is changed from the first state to the second state;

a second distance detector configured to measure a second conveyance distance of the original by which the original has been conveyed from a time when the original sensor is changed from the second state to the first state before the original sensor is changed from the first state to the second state; and a controller configured to control the conveyor so that:

the conveyor starts a conveyance of a succeeding original in a case where the second conveyance distance reaches a second distance before the original sensor changes from the first state to the second state and thereafter the original sensor changes from the first state to the second state, the second distance being a length obtained by adding a margin to the length of the original obtained by the original length obtaining unit;

the conveyor suspends the conveyance of the succeeding original in a case where the original sensor changes from the second state to the first state after the conveyance of the succeeding original is started and before the first conveyance distance reaches a first distance, the first distance being longer than a size of a punch hole provided in the original and shorter than an interval in which a plurality of originals are conveyed; and the conveyor restarts the conveyance of the succeeding original in a case where the first conveyance distance reaches the first distance after the conveyance of the succeeding original is suspended.

10. An image reading apparatus, comprising:

an image sensor configured to read an image on an original;

an original tray on which the original is to be placed;

a conveyor configured to convey the original placed on the original tray to a reading position in which the image sensor reads the original;

an original length obtaining unit configured to obtain a length, in a conveyance direction, of the original that is placed on the original tray before the original is conveyed by the conveyor;

an original sensor provided between the original tray and the reading position and configured to assume a first state when the original sensor detects the original that is being conveyed by the conveyor and assume a second state when the original sensor does not detect the original;

a first distance detector configured to measure a first conveyance distance of the original by which the original has been conveyed from a time when the original sensor is changed from the first state to the second state;

a second distance detector configured to measure a second conveyance distance of the original by which the original has been conveyed from a time when the original sensor is changed from the second state to the first state before the original sensor is changed from the first state to the second state; and a controller configured to control the conveyor so that:

the conveyor starts a conveyance of a succeeding original if the original sensor does not change from the second state to the first state when the first conveyance distance reaches a first distance in a case where the original sensor changes from the first state to the second state before the second conveyance distance reaches a second distance and thereafter the second conveyance distance does not reach the second distance when the first conveyance distance reaches the first distance, the second distance being a length obtained by adding a margin to the length of the original obtained by the original length obtaining unit, the first distance being longer than a size of a punch hole provided in the original and shorter than an interval in which a plurality of originals are conveyed; and the conveyor does not start the conveyance of the succeeding original even if the original sensor changes from the second state to the first state before the first conveyance distance reaches the first distance in a case where the original sensor changes from the first state to the second state before the second conveyance distance reaches the second distance and thereafter the second conveyance distance does not reach the second distance when the first conveyance distance reaches the first distance, and thereafter the conveyor starts the conveyance of the succeeding original when the second conveyance distance reaches the second distance after the original sensor changes from the first state to the second state and before the first conveyance distance reaches the first distance.

* * * * *